United States Patent
Fradkin et al.

(10) Patent No.: US 11,481,147 B1
(45) Date of Patent: Oct. 25, 2022

(54) BUFFER ALLOCATION TECHNIQUES

(71) Applicant: EMC IP Holding Company LLC, Hopkinton, MA (US)

(72) Inventors: Igor Fradkin, Sharon, MA (US); Scott Rowlands, Marietta, GA (US); Arieh Don, Newton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/350,502

(22) Filed: Jun. 17, 2021

(51) Int. Cl.
*G06F 3/06* (2006.01)

(52) U.S. Cl.
CPC .......... *G06F 3/0656* (2013.01); *G06F 3/0604* (2013.01); *G06F 3/067* (2013.01); *G06F 3/0631* (2013.01)

(58) Field of Classification Search
CPC .... G06F 3/0656; G06F 3/0604; G06F 3/0631; G06F 3/067
USPC ........................................................ 711/154
See application file for complete search history.

(56) References Cited

U.S. PATENT DOCUMENTS

| 7,949,637 | B1 | 5/2011 | Burke | |
|---|---|---|---|---|
| 11,132,143 | B2* | 9/2021 | Jang | ..................... G06F 3/0604 |
| 2009/0070541 | A1 | 3/2009 | Yochai | |
| 2016/0378349 | A1* | 12/2016 | Wigmore | .............. G06F 3/0647 711/165 |
| 2017/0351452 | A1* | 12/2017 | Boyd | ..................... G06F 3/0611 |
| 2021/0089458 | A1* | 3/2021 | Fruchter | ............. G06F 12/1441 |
| 2021/0157660 | A1 | 5/2021 | Benhanokh et al. | |

* cited by examiner

*Primary Examiner* — Than Nguyen
(74) *Attorney, Agent, or Firm* — Muirhead and Saturnelli, LLC

(57) ABSTRACT

Techniques for transmitting data may include: statically allocating a first buffer by a first entity; determining, by the second code entity, whether first data to be returned to the first entity fits into a data area of the first buffer; storing the first data in the data area of the first buffer responsive to determining the first data fits into the data area of the first buffer; and responsive to determining the first data does not fit into the data area of the first buffer, performing first processing by the second entity to store the first data in a dynamically allocated second buffer having a descriptor stored in the first buffer. The descriptor may include the address and size of the second buffer. The first and second entity may be code entities in the same system, or may be different systems that communicate using a remote direct memory access protocol.

20 Claims, 11 Drawing Sheets

BUFFER ALLOCATION TECHNIQUES

BACKGROUND

Technical Field

This application generally relates to data storage.

Description of Related Art

Data storage systems (often referred to herein simply as "storage systems") may include storage resources used by one or more host systems (sometimes referred to herein as "hosts") to store data. One or more storage systems and one or more host systems may be interconnected by one or more network components, for example, as part of a switching fabric, to form a data storage network (often referred to herein simply as "storage network"). Storage systems may provide any of a variety of data services to host systems of the storage network.

A host system may host applications that utilize the data services provided by one or more storage systems of the storage network to store data on the physical storage devices (e.g., tape, disks or solid state devices) thereof. For a given application, to perform I/O operations utilizing a physical storage device of the storage system, one or more components of the host system, storage system and network components therebetween may be used. Each of the one or more combinations of these components over which I/O operations between an application and a physical storage device can be performed may be considered an I/O path between the application and the physical storage device. These I/O paths collectively define a connectivity of the storage network.

SUMMARY OF THE INVENTION

Various embodiments of the techniques herein may include a method, a system and a computer readable medium for transmitting data comprising: statically allocating a first buffer by a first entity; providing a first address of the first buffer to a second entity; determining, by the second code entity, whether first data to be returned to the first entity fits into a data area of the first buffer; storing the first data in the data area of the first buffer responsive to determining the first data fits into the data area of the first buffer; and responsive to determining the first data does not fit into the data area of the first buffer, performing first processing by the second entity, the first processing comprising: dynamically allocating a second buffer that is large enough to hold the first data; storing the first data in the second buffer; storing a descriptor for the second buffer in the data area of the first buffer; and storing an indicator in the first buffer, wherein the indicator has a first value that indicates the data area of the first buffer does not include the first data and is in accordance with a metadata format including a descriptor of the second buffer, wherein the second buffer includes the first data returned from the second entity to the first entity.

In at least one embodiment, the descriptor may include an address of the second buffer and a size of the second buffer. The first entity and the second entity may be code entities executing in a same system. The first entity and the second entity may have access to a memory of the same system. The first buffer may be a first portion of the memory of the same system, and the second buffer may be a second portion of the memory of the same computer.

In at least one embodiment, processing performed may include sending a first message from the first entity to the second entity, wherein the first message includes a first address of the first buffer. Processing may include sending a second message from the second entity to the first entity, wherein the second message includes the first address of the first buffer. Responsive to receiving the second message, second processing may be performed by the first entity. The second processing performed by the first entity may include: using the first address of the first buffer to retrieve a current value for the indicator stored in the first buffer; determining whether the current value of the indicator is equal to the first value; and responsive to determining that the current value of the indicator is equal to the first value, performing third processing by the first entity comprising: using the descriptor stored in the data area of the first buffer to read the first data stored in the second buffer. The second processing may further include responsive to determining that the current value of the indicator is not equal to the first value, retrieving the first data from the data area of the first buffer. The third processing performed by the first entity may include deallocating the second buffer.

In at least one embodiment, the first entity may be a first system having a first memory, the second entity may be a second system having a second memory, the first system may be configured to directly access the second memory of the second system, and the second system may be configured to directly access the first memory of the first system. The first system and the second system may communicate with one another in accordance with a remote direct memory access protocol that allows the first system to access the second memory and allows the second system to directly access the first memory.

BRIEF DESCRIPTION OF THE DRAWINGS

Features and advantages of the present invention will become more apparent from the following detailed description of illustrative embodiments thereof taken in conjunction with the accompanying drawings in which.

DETAILED DESCRIPTION OF EMBODIMENTS

A storage system may have a plurality of physically discrete computing modules (hereinafter "computing modules") interconnected by an internal switching fabric of the storage system. For example, a computing module may be a director board of a PowerMax™ data storage system made available from Dell EMC. Each computing module may have its own dedicated local memory and a global memory (GM) segment that is a portion of a distributed GM shared by multiple (e.g., all) computing modules. Each computing module may include one or more central processing units (CPUs). In at least one embodiment, each of the CPUs may be a multi-core CPU including multiple processing cores or processors. The individual cores or processors within a single CPU can execute multiple instruction streams in parallel thereby increasing the performance of software which has been written to take advantage of the unique architecture. In at least one embodiment, one or more of the CPUs may be configured (e.g., hardwired, hardcoded or programmed) as a functional component of a storage system, for example, a front-end adapter (FA), or back-end adapter (BEA) as described in more detail herein, or as some other functional component, for example, an extended data services component (EDS) responsible for one or more data services, e.g., memory management for I/O operations.

Figure 1:
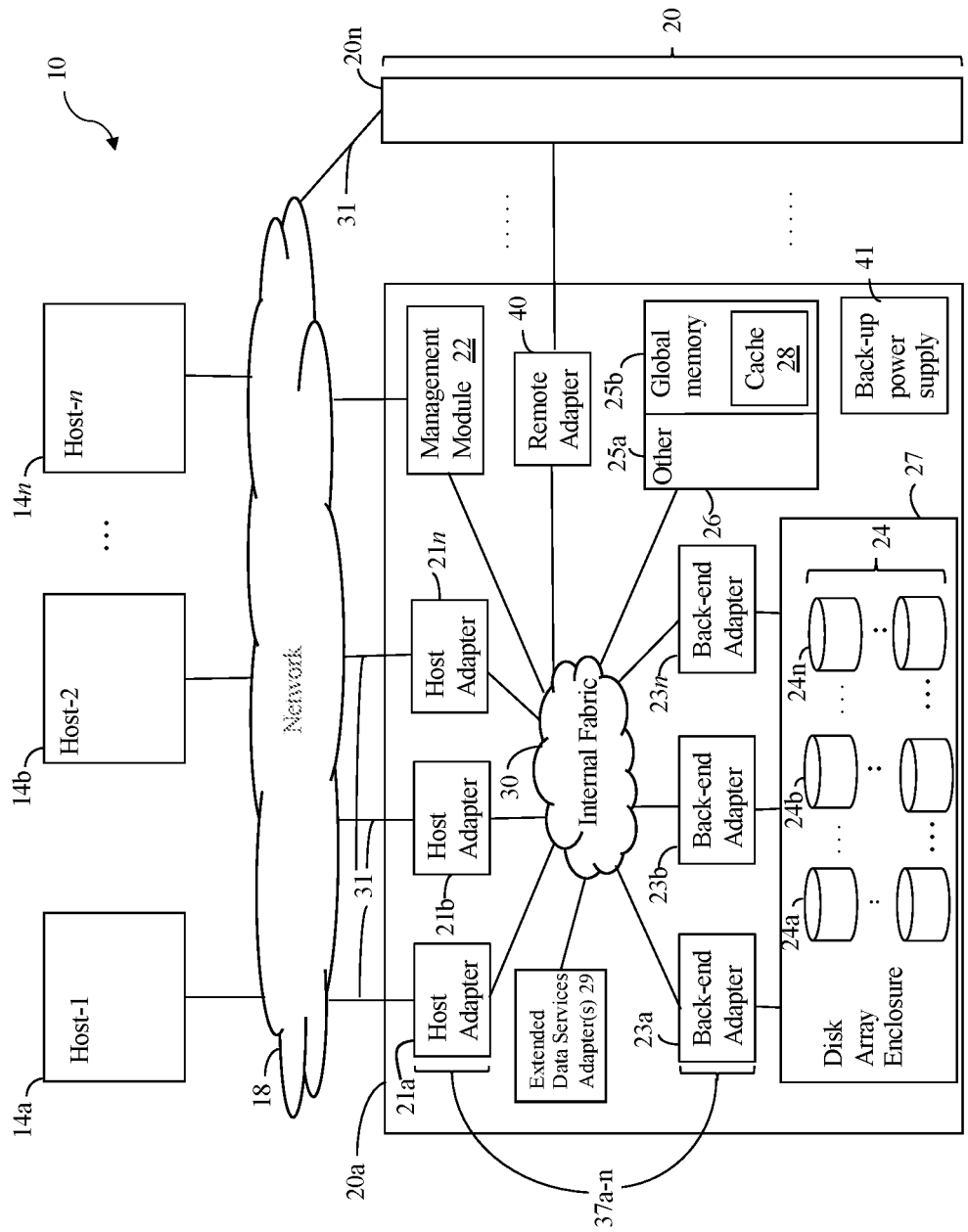
FIGS. 1 and 3 are diagrams illustrating examples of a data storage network in an embodiment in accordance with the techniques herein.

FIG. 1 illustrates an example of an embodiment of a data storage network 10 (often referred to herein as a "storage network"). The storage network 10 may include any of: host systems (i.e., "hosts") 14a-n; network 18; one or more storage systems 20a-n; other components; or any suitable combination of the foregoing. The storage systems 20a-n, connected to the host systems 14a-n through the network 18, may collectively constitute a distributed storage system 20. All of the host computers 14a-n and the storage systems 20a-n may be located at the same physical site, or, alternatively, two or more host computers 14a-n and/or storage systems 20a-n may be located at different physical locations. The storage network 10 or portions thereof (e.g., one or more storage systems 20a-n in combination with network 18) may be any of a variety of types of storage networks, such as, for example, a storage area network (SAN), e.g., of a data center. Embodiments of the techniques described herein are in reference to the storage system 20a, but it should be appreciated that such embodiments may be implemented using other discrete storage systems (e.g., storage system 20n), alone or in combination with storage system 20a.

The N hosts 14a-n may access the storage system 20a, for example, in performing input/output (I/O) operations or data requests, through the network 18. For example, each of the hosts 14a-n may include one or more host bus adapters (HBAs) (not shown) that each include one or more host ports for connecting to the network 18. The network 18 may include any one or more of a variety of communication media, switches and other components known to those skilled in the art, including, for example: a repeater, a multiplexer or even a satellite. Each communication medium may be any of a variety of communication media including, but not limited to: a bus, an optical fiber, a wire and/or other type of data link, known in the art. The network 18 may include at least a portion of the Internet, or a proprietary intranet, and components of the network 18 or components connected thereto may be configured to communicate in accordance with any of a plurality of technologies, including, for example: SCSI, ESCON, Fibre Channel (FC), iSCSI, FCoE, GIGE (Gigabit Ethernet), NVMe (Non-volatile Memory Express) over Fabric (NVMe-of); other technologies, or any suitable combinations of the foregoing, each of which may have one or more associated standard specifications. In some embodiments, the network 18 may be, or include, a storage network fabric including one or more switches and other components. A network located externally to a storage system that connects host systems to storage system resources of the storage system, may be referred to herein as an "external network."

Each of the host systems 14a-n and the storage systems 20a-n included in the storage network 10 may be connected to the network 18 by any one of a variety of connections as may be provided and supported in accordance with the type of the network 18. The processors included in the host computer systems 14a-n may be any one of a variety of proprietary or commercially available single or multi-processor system, such as an Intel-based processor, or other type of commercially available processor able to support traffic in accordance with each particular embodiment and application. Each of the host computer systems may perform different types of I/O operations in accordance with different tasks and applications executing on the hosts. In the embodiment of FIG. 1, any one of the host computers 14a-n may issue an I/O request to the storage system 20a to perform an I/O operation. For example, an application executing on one of the host computers 14a-n may perform a read or write operation resulting in one or more I/O requests being transmitted to the storage system 20a.

Each of the storage systems 20a-n may be manufactured by different vendors and interconnected (not shown). Additionally, the storage systems 20a-n also may be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by each of the host computer systems 14a-n, for example, to the storage systems 20a-20n. It should be appreciated that the particulars of the hardware and software included in each of the components that may be included in the storage systems 20a-n are described herein in more detail, and may vary with each particular embodiment.

Each of the storage systems, such as 20a, may include a plurality of physical storage devices 24 (e.g., physical non-volatile storage devices) such as, for example, disk devices, solid-state storage devices (SSDs, e.g., flash, storage class memory (SCM), NVMe SSD, NVMe SCM) or even magnetic tape, and may be enclosed within a disk array enclosure (DAE) 27. In some embodiments, two or more of the physical storage devices 24 may be grouped or arranged together, for example, in an arrangement consisting of N rows of physical storage devices 24a-n. In some embodiments, one or more physical storage devices (e.g., one of the rows 24a-n of physical storage devices) may be connected to a back-end adapter ("BEA") (e.g., a director configured to serve as a BEA) responsible for the backend management of operations to and from a portion of the physical storage devices 24. A BEA is sometimes referred to by those in the art as a disk adapter ("DA") because of the development of such adapters during a period in which disks were the dominant type of physical storage device used in storage systems, even though such so-called DAs may be configured to manage other types of physical storage devices (e.g., SSDs). In the system 20a, a single BEA, such as 23a, may be responsible for the management of one or more (e.g., a row) of physical storage devices, such as row 24a. That is, in some configurations, all I/O communications with one or more physical storage devices 24 may be controlled by a specific BEA. The BEAs 23a-n may employ one or more technologies in communicating with, and transferring data to/from, physical storage devices 24, for example, SAS, SATA or NVMe. For NVMe, to enable communication between each BEA and the physical storage devices that it controls, the storage system may include a PCIe switch for each physical storage device controlled by the BEA; i.e., connecting the physical storage device to the controlling BEA.

It should be appreciated that the physical storage devices are not limited to being arranged in rows. Further, the DAE 27 is not limited to enclosing disks, as the name may suggest, but may be constructed and arranged to enclose a plurality of any type of physical storage device, including any of those described herein, or combinations thereof.

The system 20a also may include one or more host adapters ("HAs") 21a-n, which also may be referred to herein as front-end adapters ("FAs") (e.g., directors configured to serve as FAs). Each of these FAs may be used to manage communications and data operations between one or more host systems and GM 25b of memory 26. The FA may be, or include, a Fibre Channel (FC) adapter if FC is a technology being used to communicate between the storage system 20a and the one or more host systems 14a-n, or may be another type of adapter based on the one or more technologies being used for I/O communications.

Also shown in the storage system 20a is a remote adapter ("RA") 40. The RA may be, or include, hardware that includes a processor used to facilitate communication and data exchanges between storage systems (e.g., 20a and 20n), such as between two of the same or different types of storage systems, and/or may be implemented using a director.

The storage system 20a also may include one or more extended data service adapters 29 (EDSs) which are directors configured to serve as EDSs. An EDS may perform various data services, for example, including such services or processing in connection with facilitating other processing performed by BEAs and FAs. For example, an EDS may perform processing that manages metadata tables of information used by other directors such as BEAs in connection with I/O operations, data deduplication, and the like.

The storage system 20a also may include a management module 22, which may be configured (e.g., dedicated) to performing storage management functions or services such as, for example, storage provisioning, device configuration, tier management, other services, or any combination of other services. The management module may be configured to be accessed by only certain personnel (e.g., storage administrators, support engineers) and may have its own dedicated hardware, firmware, software, CPU resources and OS, and may be loaded with one or more applications, tools, CLIs (command line interfaces), APIs (application programming interfaces), and the like, to enable management. In some embodiments, the management module, or portions thereof, may be located external to storage system 20a, for example, as part of one of host systems 14a-n or another separate system connected to the storage system 20a via the network 18.

The FAs, BEAs, EDSs and RAs may be collectively referred to herein as directors 37a-n. Each director 37a-n may include a processing core including compute resources, for example, one or more CPUs cores and/or a CPU complex for processing I/O operations, and may be implemented on a circuit board, as described in more detail elsewhere herein. There may be any number of directors 37a-n, which may be limited based on any of a number of factors, including spatial, computation and storage limitations. In an embodiment disclosed herein, there may be up to sixteen directors coupled to the memory 26. Other embodiments may use a higher or lower maximum number of directors.

The system 20a also may include an internal switching fabric (i.e., internal fabric) 30, which may include one or more switches, that enables internal communications between components of the storage system 20a, for example, the directors 37a-n (FAs 21a-n, BEAs 23a-n, EDSs 29, RA 40, management module 22) and the memory 26, e.g., to perform I/O operations. One or more internal logical communication paths may exist between the directors and the memory 26, for example, over the internal fabric 30. For example, any of the directors 37a-n may use the internal fabric 30 to communicate with other directors to access any of physical storage devices 24; i.e., without having to use memory 26. In addition, one of the directors 37a-n may be able to broadcast a message to all of the other directors 37a-n over the internal fabric 30 at the same time. Each of the components of system 20a may be configured to communicate over internal fabric 30 in accordance with one or more technologies such as, for example, InfiniBand (IB), Ethernet, Gen-Z, another technology, or any suitable combination of the foregoing.

The GM portion 25b may be used to facilitate data transfers and other communications between the directors 37a-n in a storage system. In one embodiment, the directors 37a-n (e.g., serving as FAs, EDSs, or BEAs) may perform data operations using a cache 28 that may be included in the GM 25b, for example, in communications with other directors, and other components of the system 20a. The other portion 25a is that portion of memory that may be used in connection with other designations that may vary in accordance with each embodiment. The GM 25b and the cache 28 are described in more detail elsewhere herein. It should be appreciated that, although the memory 26 is illustrated in FIG. 1 as being a single, discrete component of storage system 20a, the techniques herein are not so limited. In some embodiments, memory 26, or the GM 25b or the other memory 25a thereof, may be distributed among a plurality of circuit boards (i.e., "boards"), as described in more detail elsewhere herein.

In at least one embodiment, write data received at the storage system from a host or other client may be initially written to the cache 28 and marked as write pending (WP). For example, the cache 28 may be partitioned into one or more portions called cache slots, which may be a of a predefined uniform size, for example, 128 Kbytes. Write data of a write operation received at the storage system may be initially written (i.e., staged) in one or more of these cache slots and marked as write pending. Once written to the cache 28, the host (e.g., one of 14a-n) may be notified that the write operation has completed. At a later time, the write data may be de-staged from the cache 28 to one or more physical storage devices 24a-n, such as by a BEA.

When the data storage system receives a read I/O operation from the host, the data storage system may determine whether the requested read data needed to service the read I/O operation is in the cache 28. If so, processing determines a read cache hit has occurred whereby the requested read data is retrieved from the cache and returned to the host. If the requested read data is not in the cache, processing determines that a read cache miss has occurred. Responsive to the read cache miss occurring, the requested read data is retrieved from the BE PDs providing the non-volatile BE storage and stored in the cache. Subsequently, the read data (now stored in the cache) is read from the cache and returned to the requesting host.

It should be noted that, although examples of techniques herein may be made with respect to a physical storage system and its physical components (e.g., physical hardware for each RA, EDS, BEA, FA and the like), the techniques herein may be performed in a physical storage system including one or more emulated or virtualized components (e.g., emulated or virtualized ports, emulated or virtualized EDSs, BEAs or FAs), and also a virtualized or emulated storage system including virtualized or emulated components. For example, in embodiments in which NVMe technology is used to communicate with, and transfer data between, a host system and one or more FAs, one or more of the FAs may be implemented using NVMe technology as an emulation of an FC adapter.

The storage system 20a may include a back-up power supply 41 (e.g., a battery) that can provide power to the storage system for a limited amount of time to after primary (AC) power fails. This limited time may allow certain tasks to be performed during a window time beginning when the primary power fails until the earliest of: the primary power is restored; and the end of the limited lifetime (sometimes on the order of second or tens of seconds) of the back-up power supply. For example, during this window of time, the contents of the cache 28 may be de-staged to one or more physical storage devices.

Any of the storage systems 20a-n, or one or more components thereof, described in relation to FIGS. 1-2 may be implemented using one or more Symmetrix®, VMAX®, VMAX3® or PowerMax™ systems made available from Dell EMC (elsewhere referred to herein collectively as PowerMax Systems).

The host systems 14a-n may provide data and control (e.g., management and access control) information to the storage systems 20a-n over a plurality of I/O paths defined between the host systems and the storage systems, for example, including host system components, storage system components, and network components (e.g., of network 18), and the storage systems also may provide data to the host systems across the I/O paths. In the embodiment of FIG. 1, the host systems may not address the physical storage devices (e.g., disk drives or flash drives) 24 of the storage systems directly. Rather access to data may be provided to one or more host systems from what the host systems view as a plurality of logical storage units (LSUs) including, for example, a logical volume, logical block, LUN (i.e., logical device or logical disk), thin or virtually provisioned device, groups of logical devices (e.g., storage group), NVMe namespace, and other types of LSUs. For example, a PowerMax storage system may be configured to organize available storage resources (e.g., physical storage devices) into many LUNs, each with its own addressable space defined in logical blocks addresses (LBAs). The LSUs may or may not correspond to the actual physical storage devices. For example, one or more LSUs may map to a single physical storage device; that is, the logical address space of the one or more LSU may map to physical space on a single physical storage device. Data in a single storage system may be accessed by multiple hosts allowing the hosts to share the data residing therein. The FAs may be used in connection with communications between a storage system and a host system. The RAs may be used in facilitating communications between two storage systems. The BEAs may be used in connection with facilitating communications to the associated physical storage device(s) based on LSU(s) mapped thereto.

Figure 2A:
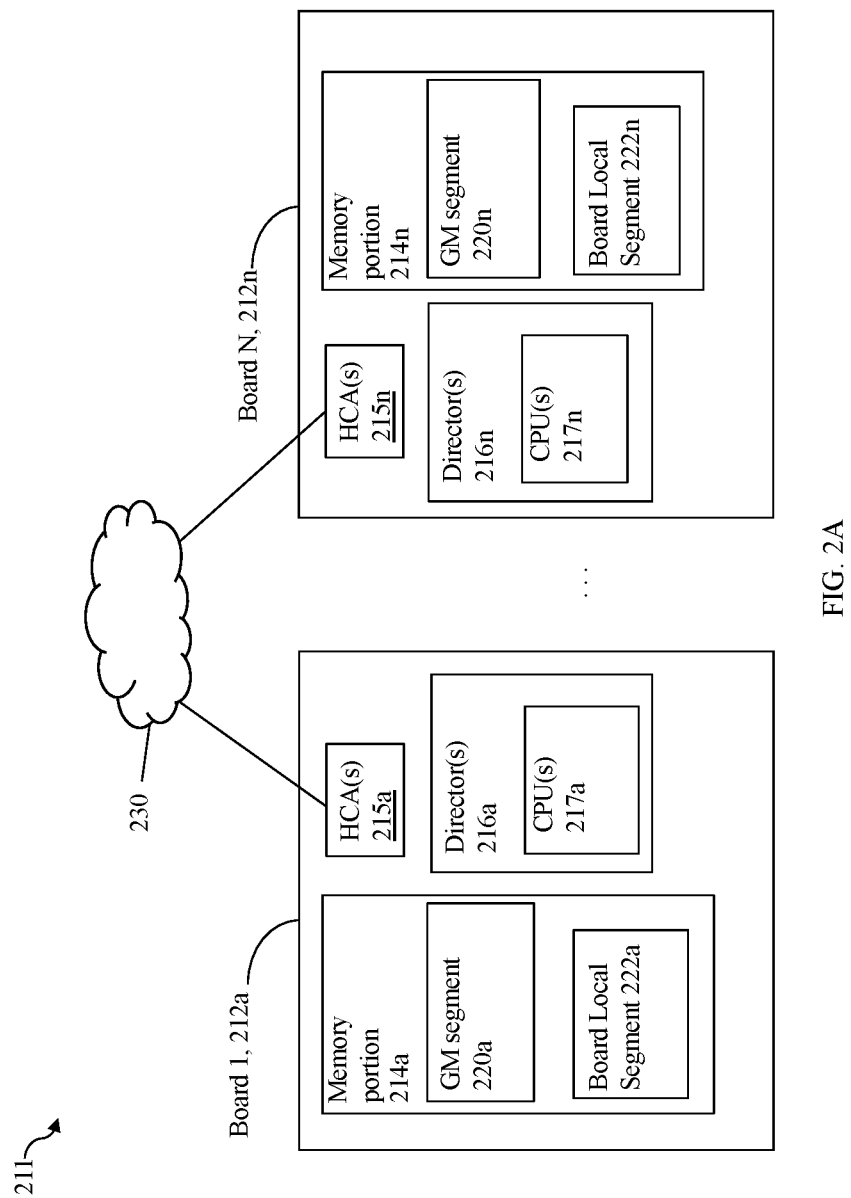
FIG. 2A is a block diagram illustrating an example of a storage system including multiple circuit boards in an embodiment in accordance with the techniques herein.

FIG. 2A is a block diagram illustrating an example of at least a portion 211 of a storage system (e.g., 20a) including multiple boards 212a-212n. The storage system 211 may include a plurality of boards 212a-212n and a fabric 230 (e.g., internal fabric 30) over which the boards 212a-n may communicate. Each of the boards 212a-212n may include components thereon as illustrated. The fabric 230 may include, for example, one or more switches and connections between the switch(es) and boards 212a-212n. In at least one embodiment, the fabric 230 may be an IB fabric.

In the following paragraphs, further details are described with reference to board 212a but each of the N boards in a system may be similarly configured. For example, the board 212a may include one or more directors 216a (e.g., directors 37a-n) and memory portion 214a. The one or more directors 216a may include one or more CPUs 217a including compute resources, for example, one or more cores or processing units and/or a CPU complex for processing I/O operations. One or more of the CPUs may be configured to function as one of the directors 37a-n described herein. For example, element 216a of board 212a may be configured to operate, such as by executing code, as any one or more of an FA, BEA, RA, and the like. In at least one embodiment, each of the directors may include a multicore CPU.

Each of the boards 212a-n may include one or more host channel adapters (HCAs) 215a-n, respectively, that physically couple, and are configured to enable communication between, the boards 212a-n, respectively, and the fabric 230. In some embodiments, the fabric 230 may include multiple (e.g., 2) switches, and each HCA 215a-n may have multiple (e.g., 2) ports, each one connected directly to one of the switches.

Each of the boards 212a-n may, respectively, also include memory portions 214a-n. The memory portion of each board may be characterized as locally accessible with respect to that particular board and with respect to other components on the same board. For example, the board 212a includes the memory portion 214a which is memory that is local to that particular the board 212a. Data stored in the memory portion 214a may be directly accessed by a CPU or core of a director 216a of the board 212a. For example, the memory portion 214a may be a fast memory (e.g., DIMM (dual inline memory module) DRAM (dynamic random access memory)) that is locally accessible by a director 216a where data from one location in 214a may be copied to another location in 214a directly using DMA (direct memory access) operations (e.g., local memory copy operations) issued by the director 216a. Thus, the director 216a may directly access data of 214a locally without communicating over the fabric 230.

The memory portions 214a-214n of the boards 212a-n may be further partitioned into different portions or segments for different uses. For example, each of the memory portions 214a-214n may respectively include the GM segments 220a-n configured for collective use as segments of a distributed GM. Thus, data stored in any GM segment 220a-n may be accessed by any director 216a-n on any board 212a-n. Additionally, each of the memory portions 214a-n may respectively include the board local segments 222a-n. Each of the board local segments 222a-n are respectively configured for use locally by the one or more directors 216a-n, and possibly other components, residing on the same single board. In at least one embodiment where there is a single director denoted by 216a (and generally by each of 216a-n), data stored in the board local segment 222a may be accessed by the respective single director 216a located on the same board 212a. However, the remaining directors located on other ones of the N boards may not access data stored in the board local segment 222a.

To further illustrate, the GM segment 220a may include information such as user data stored in the data cache, metadata, and the like, that is accessed (e.g., for read and/or write) generally by any director of any of the boards 212a-n. Thus, for example, any director 216a-n of any of the boards 212a-n may communicate over the fabric 230 to access data in GM segment 220a. In a similar manner, any director 216a-n of any of the boards 212a-n may generally communicate over fabric 230 to access any GM segment 220a-n comprising the GM. Although a particular GM segment, such as 220a, may be locally accessible to directors on one particular board, such as 212a, any director of any of the boards 212a-n may generally access the GM segment 220a. Additionally, the director 216a may also use the fabric 230 for data transfers to and/or from GM segment 220a even though 220a is locally accessible to director 216a (without having to use the fabric 230).

Also, to further illustrate, the board local segment 222a may be a segment of the memory portion 214a on the board 212a configured for board-local use solely by components on the single/same board 212a. For example, the board local segment 222a may include data which is used and accessed only by the directors 216a included on the same board 212a as the board local segment 222a. In at least one embodiment in accordance with the techniques herein, each of the board local segments 222a-n may include a local page table or page directory used, respectively, by only director(s) 216a-n local to each of the boards 212a-n.

In such an embodiment as in FIG. 2A, the GM segments 220a-n may be logically concatenated or viewed in the aggregate as forming one contiguous GM logical address space of a distributed GM. In at least one embodiment, the distributed GM formed by GM segments 220a-n may include the data cache, various metadata and/or structures, and other information, as described in more detail elsewhere herein. Consistent with discussion herein, the data cache, having cache slots allocated from GM segments 220a-n, may be used to store I/O data (e.g., for servicing read and write operations).

Figure 2B:
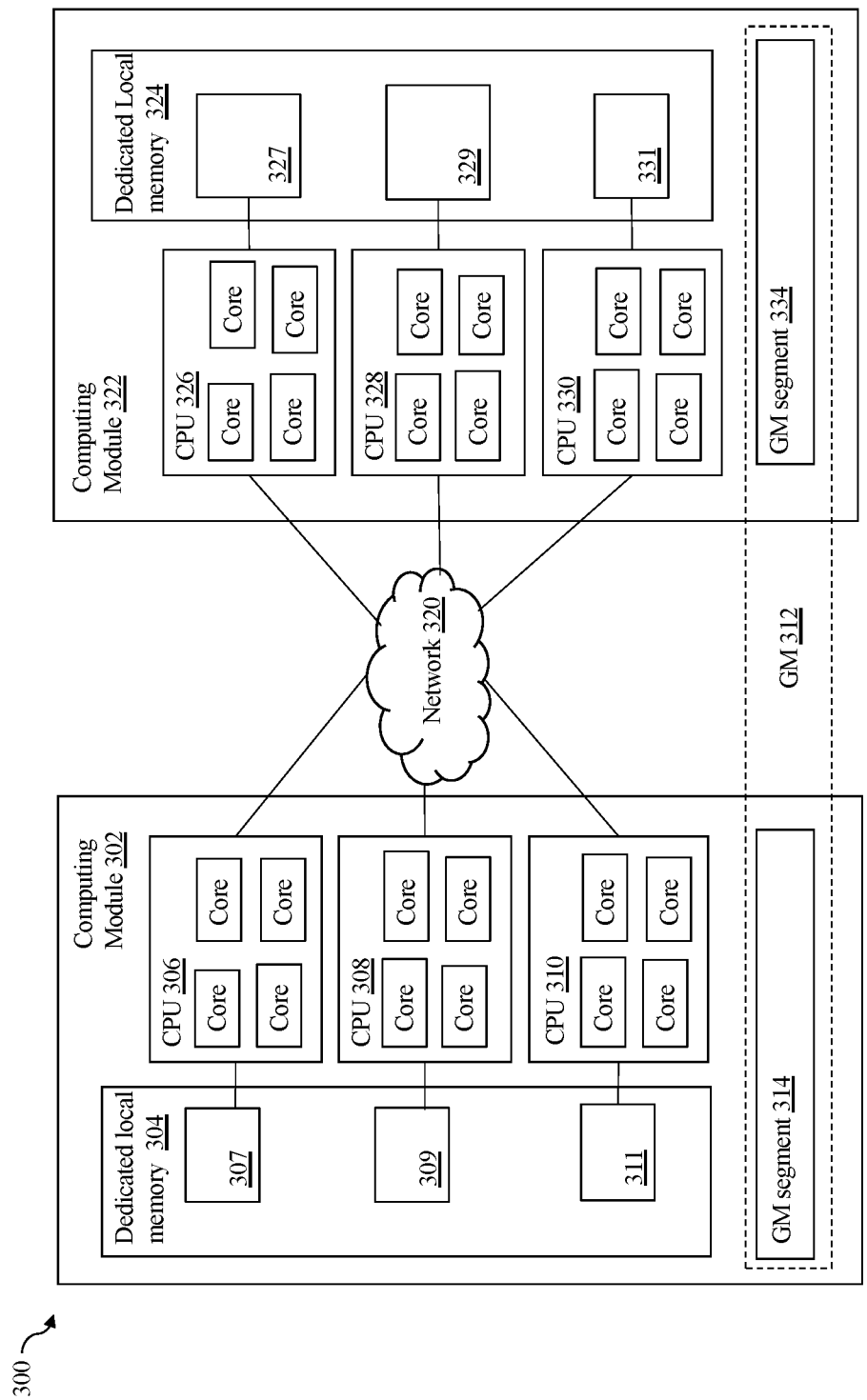
FIG. 2B is a block diagram illustrating an example of a storage system including multiple computing modules and processing cores in an embodiment in accordance with the techniques herein.

FIG. 2B is a block diagram illustrating an example of a storage system 300 including multiple computing modules and CPUs in an embodiment in accordance with the techniques herein. Other embodiments of a storage system including multiple computing modules and CPUs, for example, variations of the storage system 300, are possible and are intended to fall within the scope of embodiments of the techniques herein. The storage system 300 may be a variation of the storage system 211 and may include any of the functionality and/or component described above in relation to storage systems 211 and/or 20a.

Figure 3:
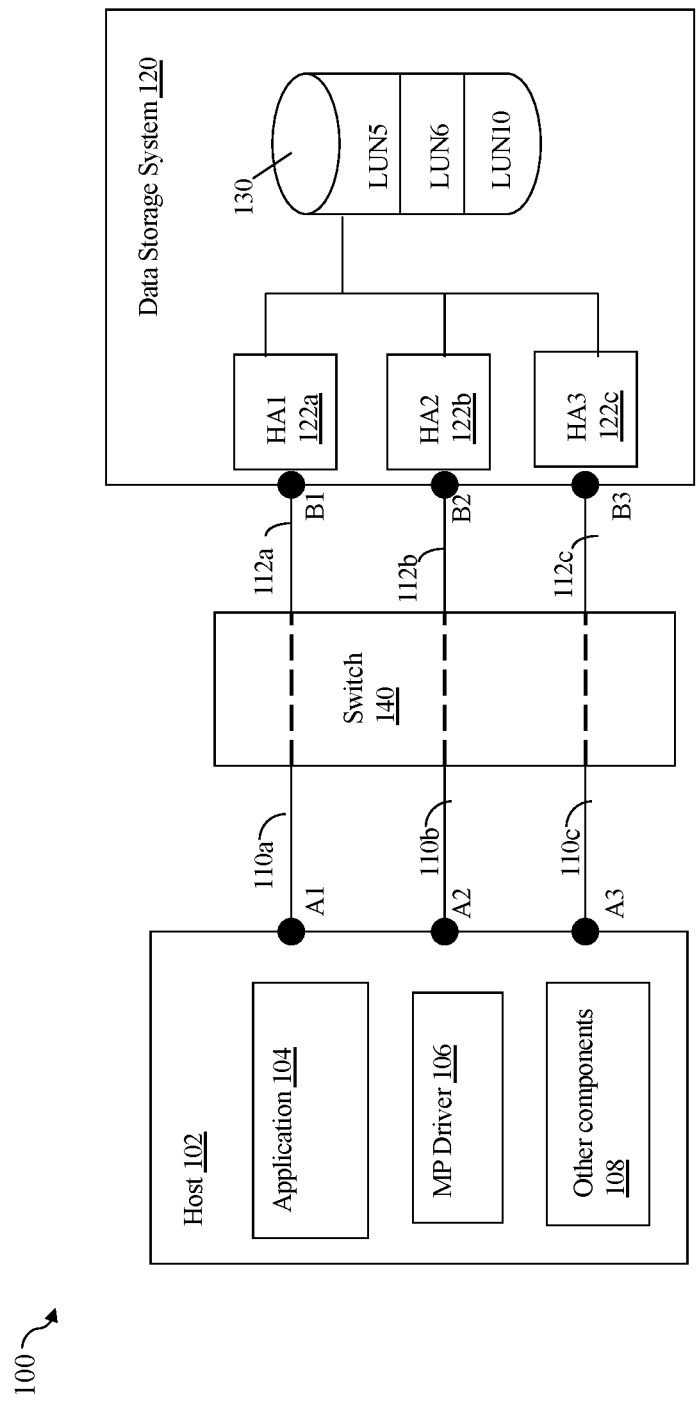

The storage system 300 may include multiple computing modules, including computing modules 302 and 322. It should be appreciated that the storage system may include more than two computing modules. Each of computing modules 302 and 322 may be a director board of a PowerMax system made available from Dell EMC. Each of the computing modules 302 and 322 may include generally one or more CPUs, where each CPU may be a single core or multi-core CPU. For example, the computing module 302 may include the CPUs 306, 308 and 310; and the computing module 322 may include the CPUs 326, 328 and 330. Each CPU may generally include one or more processing units or cores, each of which may be capable of processing a separate instruction stream. As a variation and as illustrated in the embodiment of FIG. 2B, for example, each CPU may include a plurality of processing cores, including a number other than four as illustrated in FIG. 3. In at least one embodiment, each of the CPUs 306, 308, 310, 326, 328 and 330 may be configured (e.g., hardwired, hardcoded or programmed) as a functional component or director of a storage system, for example, an FA, BEA or EDS. More generally, one or more of the CPUs 306, 308, 310, 326, 328 and 330 may be configured (e.g., hardwired, hardcoded or programmed) as a functional component of a storage system, for example, an FA, BEA or EDS.

Each of the computing modules 302, 322 may include, respectively, dedicated local memory 304, 324 dedicated to the computing module. Each of the dedicated local memories 304, 324 may be an implementation of a board local segment, such as the board local segment 222a described in relation to the storage system 211 of FIG. 2A. Further each of the CPUs 306, 308 and 310 may be allocated a portion of the local memory 304 for exclusive or private use by the single CPU. For example, the memory portions 307, 309 and 311 may be configured for exclusive or private use, respectively, by the CPUs 306, 308 and 310; and the memory portions 327, 329 and 331 may be configured for exclusive or private use, respectively, by the CPUs 326, 328 and 330.

In at least one embodiment in accordance with the techniques herein, some or all of a local memory portion designated for exclusive private use by a single CPU may be used as a local cache by the CPU. For example, the memory portion 307 may denote a portion of the dedicated local memory 304 designated as a local or private cache of the CPU 306, the memory portion 309 may denote a portion of the dedicated local memory 304 designated as a local or private cache of the CPU 308, and the memory portion 311 may denote a portion of the dedicated local memory 304 designated as a local or private cache of the CPU 310. Additionally, the memory portion 327 may denote a portion of the dedicated local memory 324 designated as a local or private cache of the CPU 326, the memory portion 329 may denote a portion of the dedicated local memory 324 designated as a local or private cache of the CPU 328, and the memory portion 331 may denote a portion of the dedicated local memory 324 designated as a local or private cache of the CPU 330.

The memory portions denoting the CPU local or private caches 307, 309, 311, 327, 329 and 331 may be configured to store values or data items used solely be each associated CPU.

The GM segment 314 may be a shared portion of a distributed GM 312. Distributed GM 312 may include a GM segment 334 of a computing module 322. The computing module 322 may be connected to the computing module 302 by an internal fabric 320

In at least one embodiment in which each CPU may include multiple processing units or cores and multiple processes may be executing simultaneously on the processing units or cores of the single CPU, processing may be performed to synchronize access to the CPU's local or private resources among the different cores of the single CPU using such resources. For example, in at least one embodiment as described above and illustrated in the FIG. 2B, each CPU may use a local or private cache configured out of the dedicated local memory (e.g., local to a single computing module or board including the processor code). In such an embodiment, any suitable synchronization technique or mechanism may be used to provide exclusive serial access, when needed, to a location or data value in each of the memory portions 307, 309, 311, 327, 329 and 331 used by the multiple cores or processing units in a single CPU. For example, a synchronization technique may be used to synchronize access to locations of the private cache 307 used by the multiple cores of the CPU 306; a synchronization technique may be used to synchronize access to locations of the private cache 309 used by the multiple cores of the CPU 308; and so on, for each of the other multicore CPUs 310, 326, 328 and 330.

As a variation, each CPU 306, 308, 310, 326, 328, 330 may rather be characterized as a processor rather than a multi-core CPU. In this case in which the CPU is rather a single processor or processing unit, there is no contention for locally used resources among multiple cores of the same CPU. In the embodiment in which the CPU is a single core or processing unit, no synchronization technique or mechanism is necessary when accessing, for example, the portions of the private cache of a single CPU. For example, if 306 denotes only a single core or processing unit CPU, then no synchronization technique or mechanism is necessary when accessing, for example, the portions of the private cache or memory 307 used exclusively by the single CPU 306.

Although not explicitly illustrated in FIG. 2B, those CPUs configured as FAs also have the necessary front end interfaces to the network, such as the network 18 of FIG. 1, to communication with external clients such as the hosts. Also, although not explicitly illustrated in FIG. 2B, those CPUs configured as BEAs also have the necessary backend interfaces, such as interfaces to the various backend (BE) non-volatile physical storage devices (PDs) 24 of FIG. 1, to read data from, and write data to, such PDs.

The data path or I/O path may be characterized as the path or flow of I/O data through a system. For example, the data or I/O path may be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receiving a response (possibly including requested data) in connection such I/O commands.

The data path or I/O path may be contrasted with a control path. The data or I/O path and the control path define two sets of different logical flow paths. The control path, also sometimes referred to as the management path, may be characterized as the path or flow of data management or control commands through a system. For example, the control or management path may be the logical flow through hardware and software components or layers in connection with issuing data storage management commands to and/or from a data storage system, and also receiving responses (possibly including requested data) to such control or management commands. For example, with reference to the FIG. 1, the control commands may be issued from data storage management software, such as the management module 22, or from a data storage system management application executing on a management system, such as another computer system or other device with a processor that is connected to the data storage system 12. Such commands may be, for example, to establish or modify data services; view performance or health of various system components and storage entities; provision storage; perform user account management; provision storage; create, modify or delete a logical storage entity; and the like. For example, commands may be issued over the control path to provision storage for LUNs; create a storage group (SG) which is a logically defined group of one or more LUNs; modify an existing SG such as by adding or removing LUNs; create a snapshot; define conditions of when to create another snapshot; define or establish local and/or remote replication services; define or modify a schedule for snapshot or other data replication services; create or configure a new RAID group; obtain data storage management and configuration information for display in a graphical user interface (GUI) of a data storage management program or application; generally modify one or more aspects of a data storage system configuration; view properties, performance, and/or status information regarding LUNs or other storage objects (e.g., physical and/or logical entities in the data storage system); and the like.

In the following paragraphs and examples provided for illustration of the techniques herein, reference may be made to a particular LSU, such as a LUN denoting a thin or virtually provisioned logical device. However, more generally, the techniques may be used in connection with any suitable LSU that may be supported and used in an embodiment.

In at least one embodiment, a LUN may be a thick or regular LUN in which the physical storage for the full capacity of the LUN may be provisioned when the LUN is created. For a thick LUN, the entire logical address space of the LUN may be mapped to physical storage locations when the LUN is initially created. As a variation in such an embodiment, a LUN may alternatively be a thin LUN or virtually provisioned LUN as noted elsewhere herein. With a thin LUN, the physical storage for the LUN may be allocated in blocks or chunks, such as slices, on demand the first or initial time there is a write to a logical address portion that is mapped to a particular slice. A logical address portion that is mapped to a slice of physical storage may or may not include data stored in the entire logical address portion. Thus, at any point in time, a physical storage slice that is mapped to a logical address portion or subrange of a thin LUN may include data stored on various portions of the slice depending on what particular logical addresses mapped to the slice have been written to. In at least one embodiment, both thick or regular LUNs and thin or virtually provisioned LUNs may be supported and thus configured in the data storage system.

Accordingly, a thin LUN presents a logical storage space to one or more clients, such as applications running on a host, where different portions of the logical storage space may or may not have corresponding physical storage space associated therewith. However, the thin LUN is not mapped directly to physical storage space. Instead, portions of the thin LUN for which physical storage space exists are mapped to data devices, which are logical devices that map logical storage space of the data device to physical storage space on the disk drives or other physical storage devices. Thus, an access of the logical storage space of the thin LUN results in either a null pointer (or equivalent) indicating that no corresponding physical storage space has yet been allocated, or results in a reference to a data device which in turn references the underlying physical storage space.

Thin LUNs and thin provisioning are described in more detail in U.S. patent application Ser. No. 11/726,831, filed Mar. 23, 2007 (U.S. Patent App. Pub. No. 2009/0070541 A1), AUTOMATED INFORMATION LIFE-CYCLE MANAGEMENT WITH THIN PROVISIONING, Yochai, EMS-147US, and U.S. Pat. No. 7,949,637, Issued May 24, 2011, Storage Management for Fine Grained Tiered Storage with Thin Provisioning, to Burke, both of which are incorporated by reference herein.

Referring to FIG. 3, shown is an example of an embodiment of a system that may be utilized in connection with the techniques herein. The example 100 includes a host 102, a switch 140 and a data storage system 120. The host 102 and the data storage system 120 may communicate over one or more paths through the switch 140. The elements 110*a*-110*c* denote connections between the host 102 and the switch 140. The elements 112a-112c denote connections between the data storage system 120 and the switch 140. The element 130 may represent a physical device of the data storage system 120 where the physical device 130 may be configured to include 3 LUNs-LUNS, LUN6 and LUN10. It should be noted that the example 100 includes only a single host, single physical device 130 with 3 LUNs, a single data storage system, and a fabric including a single switch for purposes of simplicity to illustrate the techniques herein.

The host 102 may include an application 104, a multi-path (MP) driver 106 and other components 108 whereby element 108 may also include one or more other device drivers and other code. An I/O operation from the application 104 may be communicated to the data storage system 120 using the MP driver 106 and one or more other components represented by element 108. The application 104 may be a database or other application which issues data operations, such as I/O operations, to the data storage system 120. Each of the I/O operations may be directed to a device, such as one of the LUNs of device 130, configured to be accessible to the host 102 over multiple physical paths. As such, each of the I/O operations may be forwarded from the application 104 to the data storage system 120 over one of the possible multiple paths.

The MP driver 106 may include functionality to perform any one or more different types of processing such as related to encryption, multipathing, mirroring, migration, and the like. For example, the MP driver 106 may include multipathing functionality for management and use of multiple paths where, for example, the same set of one of more LUNs may be exposed over the multiple paths. For example, when the host needs to send an I/O directed to a LUN to the data storage system, the MP driver 106 may perform path selection to select one of the possible multiple paths over which the LUN is exposed based on one or more criteria such as load balancing to distribute I/O requests for the LUN or target device across available active paths to the LUN or target device. Load balancing may be performed to provide for better resource utilization and increased performance of the host, data storage system, and network or other connection infrastructure. The MP driver 106 may be included in a commercially available product such as, for example, Dell® EMC PowerPath® software by Dell Inc. The host 102 may also include other components 108 such as one or more other layers of software used in connection with communicating the I/O operation from the host to the data storage system 120. For example, element 108 may include Fibre Channel (FC), SCSI and/or NVMe drivers, a logical volume manager (LVM), and the like. It should be noted that element 108 may include software or other components used when sending an I/O operation from the application 104 where such components include those invoked in the call stack above the MP driver 106 and also below the MP driver 106. For example, application 104 may issue an I/O operation which is communicated in a call stack including an LVM, the MP driver 106, and an FC, SCSI or NVMe driver. This is described in more detail below such as with a subsequent figure.

The data storage system 120 may include one or more physical data storage devices, such as device 130, where each such physical device may be configured to store data of one or more LUNs as described above. Each of the LUNs having data stored on the device 130 may be configured to be accessible to the host through multiple paths. For example, all LUNs of 130 may be accessible using ports of the three front end directors or interfaces 122a-122c, also denoted respectively HA1, HA2 and HA3. The multiple paths allow the application I/Os to be routed over multiple paths and, more generally, allow the LUNs of device 130 to be accessed over multiple paths. In the event that there is a component failure in one of the multiple paths, application I/Os can be easily routed over other alternate paths unaffected by the component failure. Thus, an embodiment of the MP driver 106 may also perform other processing in addition to load balancing in connection with path selection. The MP driver 106 may be aware of, and may monitor, all paths between the host and the LUNs of the device 130 in order to determine that particular state of such paths with respect to the various LUNs. In this manner, the MP driver may determine which of the multiple paths over which a LUN is visible may be used for issuing I/O operations successfully, and to use such information to select a path for host-data storage system communications issued to a particular LUN.

In the example 100, each of the LUNs of the device 130 may be configured as accessible through three paths. Each path may be represented by two path endpoints—a first endpoint on the host 102 and a second endpoint on the data storage system 120. The first endpoint may correspond to a port of a host component, such as a host bus adapter (HBA) of the host 102, and the second endpoint may correspond to a port of a data storage system component, such as a port of an HA of the data storage system 120. In the example 100, elements A1, A2 and A3 each denote a port of a host 102 (e.g., such as a port of an HBA), and elements B1, B2 and B3 each denote a target port of an HA of the data storage system 120. Each of the LUNs of the device 130 may be accessible over three paths—a first path represented by A1-B1, a second path represented by A2-B2 and a third path represented by A3-B3.

Figure 4:
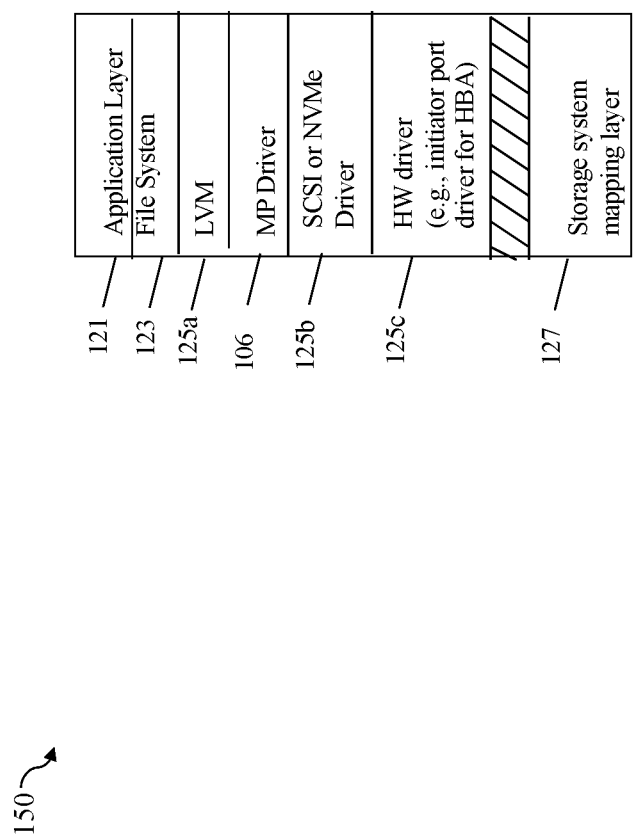
FIG. 4 is an example of a runtime stack associated with the data path or I/O path in an embodiment in accordance with the techniques herein.

Referring to FIG. 4, shown is a representation of a number of mapping layers that may be included in a computer system, such as host 102 of FIG. 3, in combination with a data storage system. FIG. 4 provides further detail regarding various software layers that may be used in connection with the MP driver 106 of FIG. 3.

In an embodiment in accordance with the techniques herein, the data storage system as generally described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

The various software layers of 150 may generally form layers included in the runtime I/O stack, such as when an I/O request is issued by an application on a host to a data storage system. The system includes an application layer 121 which includes application programs executing on the host computer 102. The application layer 121 may refer to storage locations using an associated label or identifier such as a file name or file identifier. Below the application layer 121 is the file system layer 123 and the LVM layer 125a that maps the label or identifier specified by the application layer 121 to a LUN which the host may perceive as corresponding to a physical device address (e.g., the address of one of the disk drives) within the storage system 12. Below the LVM layer 125a may be the MP (multipath) driver 106 which handles processing of the I/O received from layer 125a. The MP driver 106 may include a base driver and one or more driver extension modules. The MP driver 106 may be included in a commercially available product such as Dell® EMC PowerPath® software. Functionality for performing multipathing operations by multipathing software, such as the MP driver 106, may be included in one of the driver extension modules such as a multipath extension module. As described above, the MP driver may perform processing in connection with multiple path management and selecting one of a plurality of possible paths for use in connection with processing I/O operations and communicating with the data storage system, such as 120 of FIG. 3. More generally, one or more layers between the application layer 121 and the MP driver 106 may provide for mapping a LUN (such as used in connection with block-based storage) presented by the data storage system to the host to another logical data storage entity, such as a file, that may be used by the application layer 123. Below the MP driver 106 may be the SCSI or NVMe driver 125b and a hardware (HW) driver 125c. In at least one embodiment the driver 125b may be a SCSI driver that handles processing of a received I/O request from the MP driver 106 such as related to forming a request in accordance with the SCSI standard. As a variation, in at least one embodiment, the driver 125b may be an NVMe driver that handles processing of a received I/O request from the MP driver 106 such as related to forming a request in accordance with the NVMe standard.

At least one embodiment in accordance with the techniques herein may operate in accordance with the NVMe protocol as described, for example, in the NVM Express™ Base Specification, Revision 1.4, Jun. 10, 2019, available at nvmexpress.org/wp-content/uploads/NVM-Express-1_4-2019.06.10-Ratified.pdf. The driver 125c may be a HW driver that facilitates communication with hardware on the host. The driver 125c may be, for example, a driver for an HBA of the host which sends commands or requests to the data storage system and also receives responses and other communications from the data storage system.

In some embodiments, the data storage system 120 may be an intelligent data storage system having its own mapping layer 127 such that the LUN known or exposed to the host may not directly correspond to a physical device such as a disk drive. In such embodiments, the LUN provided by the host in connection with the I/O operation may be further mapped by the data storage system using its mapping layer 127. For example, a LUN provided by the host may be mapped by the data storage system to one or more physical drives, multiple LUNs may be located on a same physical device, multiple physical drives, and the like. In other embodiments, the data storage system may not include such a mapping layer 127.

The MP driver 106, as well as other components illustrated in FIG. 4, may execute in kernel mode or other privileged execution mode. In one embodiment using a Unix-based operating system, the MP driver 106 may execute in kernel mode. In contrast, an application such as represented by application layer 121 may typically execute in user mode, or more generally, a non-privileged execution mode. Furthermore, it will be appreciated by those skilled in the art that the techniques herein may be used in an embodiment having any one of a variety of different suitable operating systems including a Unix-based operating system as mentioned above, any one of the Microsoft Windows® operating systems, a virtualized environment, such as using the VMware™ ESX hypervisor by VMware, Inc, and the like.

In operation, an application executing at application layer 121 may issue one or more I/O operations (e.g., read and write commands or operations) to logical volumes (implemented by the LVM 125a) or files (implemented using the file system 123) whereby such I/O operation may be then mapped to data operations directed to LUNs of the data storage system. Such I/O operations from the application layer 121 may be directed to the MP driver 106 after passing through any intervening layers such as layers 123 and 125a. It should be noted that, in some embodiments, the MP driver 106 may also be below the SCSI or NVMe driver 125b.

In connection with the SCSI standard, a path may be defined between two ports as described above. A command may be sent from the host (as well as a component thereof such as a host bus adapter) and may be characterized as an initiator, originator or source with respect to the foregoing path. The host, as the initiator, sends requests to a data storage system (as well as a particular component thereof such as another HA having a port with a network address) characterized as a target, destination, receiver, or responder. Each physical connection of a path may be between a first endpoint which is a port of the host (e.g., such as of a host bus adapter having ports such as denoted as A1-A3 of FIG. 3) and a second endpoint which is a port of an HA (e.g., such as B1-B3 of FIG. 3) in the data storage system. Over each such path, one or more LUNs may be visible or exposed to the host initiator (or more specifically a host intiator port) through the target port of the data storage system.

In connection with some protocols such as SCSI and NVMe, each path as related to sending and receiving of I/O commands may include 2 endpoints. As discussed herein, the host, or port thereof, may be an initiator with respect to I/Os issued from the host to a target port of the data storage system. In this case, the host and data storage system ports are examples of such endpoints. In connection with the NVMe protocol, communication of I/O operations or other commands may be bidirectional in that either endpoint may act as an initiator and either endpoint may act as a target. In contrast, with other protocols such as the SCSI protocol, communication may be unidirectional in that one of the endpoints, such as the host HBA port, is the initiator and the other endpoint, such as the data storage system target port, is the target receiving the commands from the initiator.

An I/O command or operation, such as a read or write operation, from the host to the data storage system may be directed to a LUN and a logical address or location in the LUN's logical address space. The logical address or location of the LUN may be characterized as the target logical address of the I/O operation. The target logical address or location of the I/O operation may identify a logical block address (LBA) within the defined logical address space of the LUN. The I/O command may include various information such as identify the particular type of I/O command as read or write, identify the target logical address (e.g., LUN and LUN logical address) of the I/O command, and other information. In connection with servicing the I/O operation, the data storage system may map the target logical address to a physical storage location on a PD of the data storage system. The physical storage location may denote the physical storage allocated or provisioned and also mapped to the target logical address.

When a data storage system is communicating with external components such as, for example, hosts or other data storage systems, the communications may include transferring commands and/or data of varying sizes. More generally, transferring commands and/or data of varying sizes may be between any two code entities in the data system in connection with servicing host commands or requests. For example, a first entity may receive data from a second entity. In some systems, a data push model may be used where the first entity may initiate the request for data from the second entity whereby the requested data is returned to the first entity in response to the request made to the second entity. In some systems, a data pull model may be used where the second entity may send the data to the first entity in an unsolicited manner whereby the second entity may be characterized as the initiator or originator that initiates sending the data to the first entity.

In connection with calls or requests in some use cases, the first entity receiving the data may not know the size or amount of data to be returned. Alternatively, in connection with calls or requests in some use cases, the first entity receiving may know the size or amount of data to be returned.

In at least one embodiment, both the first entity and the second entity may be drivers, processes, threads or other code entities executing on a data storage system in connection with servicing a host command.

In accordance with a data pull model, the first entity may be a caller or requester that issues a request for data to a second entity that is a provider or server. In response, the provider or server may return the requested data to the caller. In order to accept the requested data, the caller or requester may dynamically allocate a buffer and provide a handle or reference to the buffer as a parameter in a call or request to the provider. For example, in at least one existing system, the caller or requester may provide a double pointer (e.g., pointer to a pointer) to the buffer in the parameter of the call to the provider. The provider may then use the double pointers to access the buffer and store the requested data in the buffer. Once the caller or requester no longer needs the requested data stored in the buffer, the caller or requester may then deallocate the buffer. Such dynamic buffer allocation and deallocation incurs a performance penalty due to the additional runtime overhead. Additional overhead may be incurred in connection with memory or buffer management, for example, in connection performing garbage collection.

Rather than perform dynamic allocation and deallocation, a static fixed pre-allocated buffer of a constant size (may be used. For example, in at least one existing system, the caller or requester may provide a pointer to, or address of, the buffer in the parameter of the call to the provider. The provider may then use the pointer to access the buffer and store the requested data in the buffer. In this case with the static fixed pre-allocated buffer, the buffer size needs to be large enough to accommodate the largest expected amount of data that may be received by the caller or requester. In general the amount of data returned to the caller may be much smaller than the actual size of the static buffer. As a result, there may be an inefficient use of buffer memory since not all of the memory allocated for the static buffer may be utilized for a majority of the calls.

Described in the following paragraphs are techniques that may be used in connection with a hybrid buffer allocation methodology In at least one embodiment, the techniques may be used when the amount of data to be returned or provided may vary in size, where the size may be generally unknown. The techniques provide for dynamically selecting use of either a static fixed pre-allocated buffer of a constant size (sometimes referred to herein as simply a static buffer) or a dynamically allocated buffer.

In at least one embodiment, the first entity receiving the data may allocate a small static buffer. In at least one embodiment, the size of the static buffer may be determined in accordance with testing to determine an optimal size expected to accommodate a majority of the use cases or calls. For example, in at least one embodiment, the size of the static buffer may be based on an average observed size of the data provided to receiving first entity. As another example, in at least one embodiment, it may be observed that at least N % of data or command messages sent to the receiving first entity have a size that is that is equal to or less than the selected size of the static buffer. In this latter case, N may be any suitable percentage. In at least one embodiment, the size of the static buffer may be 256 bytes with 200 bytes used as a data area for storing commands or payloads, and with the remaining 56 bytes used as a context or metadata (MD) area including information describing the 200 bytes of data in the data area.

The second entity sending the data to the first entity may dynamically allocate a second larger buffer (e.g., generally larger than the static buffer) that may be needed based on the amount of data to be sent to the first entity. In this manner, the second entity may dynamically allocate the second larger buffer as may be needed. The size of the dynamic buffer may be as large as needed to hold the data to be sent from the second entity to the first entity. The first entity may send an address or pointer to the static buffer to the second entity. If the amount of data to be provided to the first entity fits into the static buffer, the second larger buffer is not needed and the second entity may store the data in the static buffer. The first entity may then access the data as stored in the static buffer.

Alternatively, if the amount of data to be provided to the first entity does not fit into the static buffer, the second entity may dynamically allocate the second larger buffer having a suitable size to hold the data. Additionally, the second entity may format the static buffer in accordance with a new metadata (MD) format. The second entity may store a unique value V1 denoting a command (CMD) type in the context or MD area of the static buffer, where the unique value V1 for the CMD type may indicate that the static buffer contains data in accordance with the new MD format. If the CMD type is any other value besides the unique value V1, then the static buffer is not interpreted in accordance with the new MD format thereby indicating that the static buffer contains the data. The new MD format of the static buffer may include a descriptor used to access the second larger buffer. In at least one embodiment, the descriptor may include a pointer to, or the address of, the second larger buffer, and a size of the second larger buffer. Subsequently, the first entity may receive the updated static buffer from the second entity. The first entity may examine the CMD type stored in the context or MD area of the static buffer. If the CMD type of the static buffer is not V1, then the first entity access the data as stored in the data area of the static buffer. Otherwise if the CMD type of the static buffer is V1, the first entity may interpret the data area of the buffer in accordance with the new MD format. In particular, the first entity may use the address and size of the second larger buffer from the data area of the static buffer to obtain the data from second larger buffer.

Generally, the unique value V1 denoting the new MD format may be characterized as an indicator that indicates the data area of the static buffer does not include the data to be returned to from the second entity to the first entity. Rather, the data area of the static buffer includes data that is in accordance with a metadata format or layout including a descriptor to the second larger buffer, whereby the second larger buffer includes the data returned from the second entity to the first entity.

The foregoing and other aspects of the techniques herein are described in more detail in the following paragraphs.

In the following paragraphs, reference may be made to particular sizes for purposes of illustration. More generally any suitable size may be used. For example, the following paragraphs refer to a static buffer that is 256 bytes with a 200 byte data area and a 56 byte context or MD area. The context or MD area may include a 4 byte CMD type. More generally, any suitable size may be used in connection with the static buffer, the data area, the context or MD area, and the CMD type.

Figure 5:
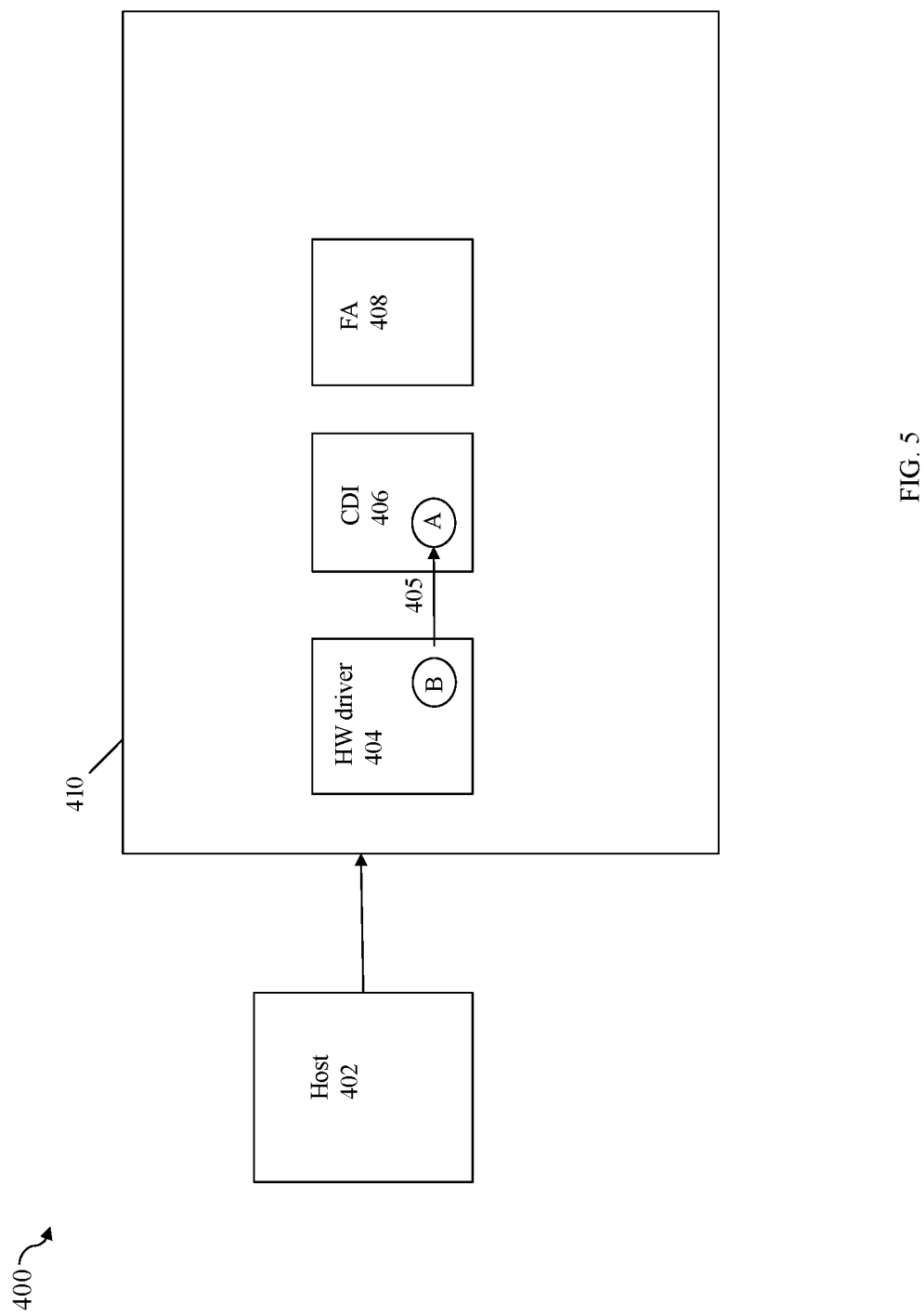
FIG. 5 is an example illustrating components in an embodiment that may utilize the techniques herein.

Referring to FIG. 5, shown is an example of components that may be used in an embodiment in accordance with the techniques herein. The example 400 includes a host 402 and data storage system 410. The data storage system 410 includes a HW driver 404, a common driver interface or CDI 406, and an FA 408. In at least one embodiment, the FA 408 may be an emulated FA. Additional details of the host 402 and the data storage system 410 discussed elsewhere herein are omitted from the example 400 for simplicity of illustration.

Generally, data may be transmitted between the host 402 and the data storage system 410. For example, the host 402 may send a write command to the system 410 and may subsequently send command data payload, such as the write data payload, to the system 410. The host 402 may, for example, send a read or other command to the system 410 where the system 410 may then return the requested read data or other data in response to the read or other command. Commands, such as command request blocks, as well as command data payload may be comprise the data exchanged between the host 402 and the data storage system 410.

Generally, front end hardware of the system 410 receives the data from the host 402. The system 410 may use the HW driver 404 to communicate with the front end hardware to receive the data from the host 402. The CDI 406 may request or poll the HW driver 404 for data. In response, the HW driver 404 may return 405 the data to the CDI 406, and then to the FA 408. Thus, 405 illustrates the flow of requested data from the HW driver 404 to the CDI 406. In the example 400, the CDI 406 may be characterized as a receiver of the data, where A denotes the role of the data receiver (sometimes referred to as receiver). The HW driver 404 may be characterized as a provider or server of the data, where B denotes the role of the provider. Although in this example CDI 406, as the receiver A, may initiate the request for the data, the provider B may also initiate or originate the sending of data from B to A.

In at least one embodiment, the techniques herein may be used in connection returning requested data from the HW driver 404 (B) to the CDI 406 (A). More generally, the techniques herein may be used in connection with sending a message with data from a provider B to a data receiver A.

In at least one embodiment, the receiver A and the provider B may be code entities executing in the same system, such as in the same data storage system as illustrated in FIG. 5. In the following paragraphs, the receiver of the data may sometimes be referred to as the first code entity or "A", and the provider of the data may sometimes be referred to as the second code entity or "B".

Figure 6A:
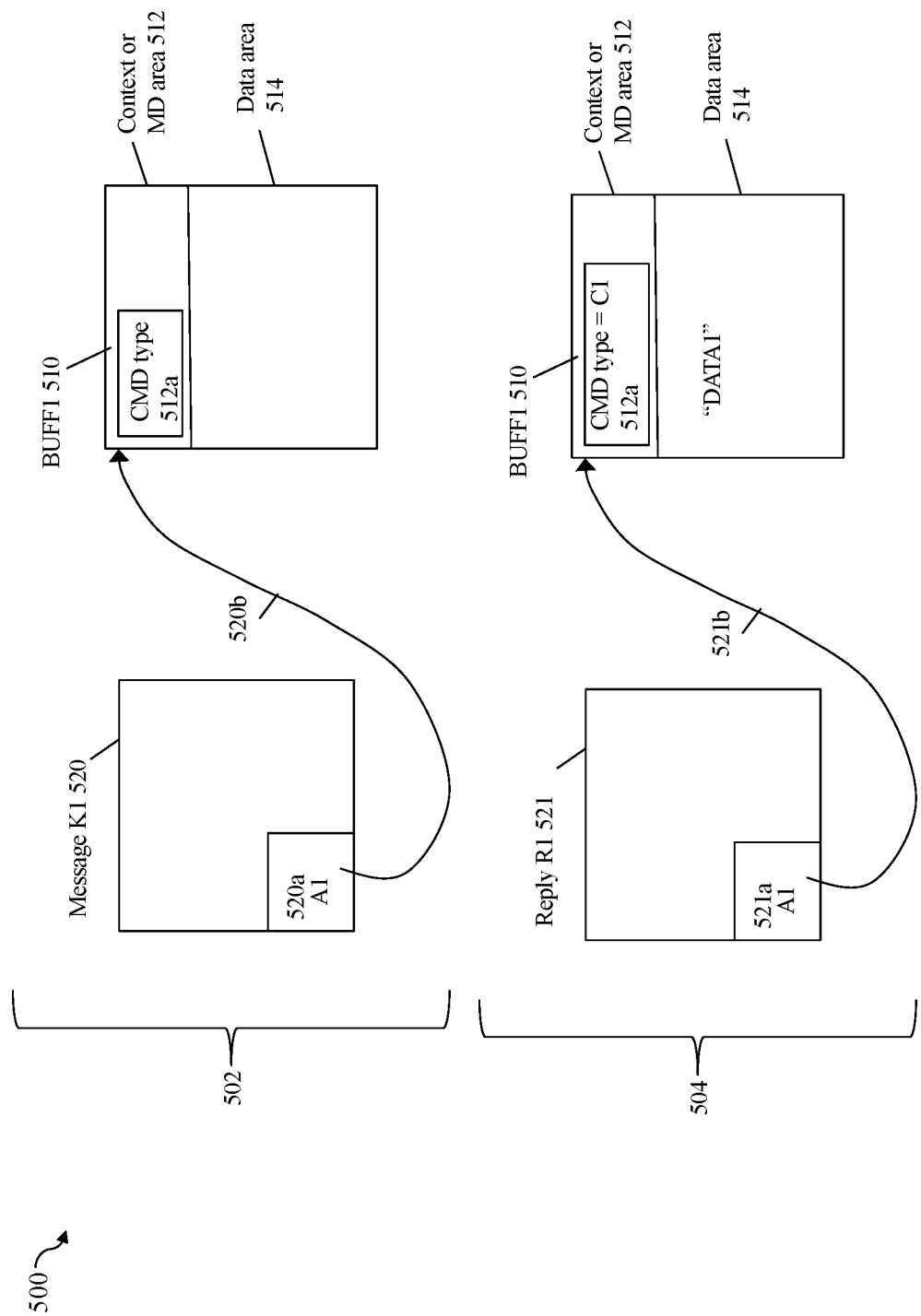
FIGS. 6A and 6B illustrate structures that may be used in an embodiment in accordance with the techniques herein.

Referring to FIG. 6A, shown is an example of structures that may be used in an embodiment in accordance with the techniques herein.

The example 500 includes an element 502 comprising the message K1 520 and the static buffer BUFF1 510. The BUFF1 510 may denote the static buffer that is statically allocated by the receiver A. Consistent with other discussion herein, the BUFF1 510 may include the context or MD area 512 and the data area 514. The context or MD area 512 may include one or more fields such as the CMD type 512a.

In a step S1, the receiver A may allocate the BUFF 510 but may not further populate the BUFF 510. From the step S1, control proceeds to the step S2 to where the receiver A may send the message K1 520 to the provider B where the message K1 520 includes the address A1 520a. The address A1 520a may be the address of, or pointer to (520b), the static buffer 510a. The message K1 520 may denote the parameters sent in a call, command or request from the receiver A to the provider B. From the step S2 control proceeds to the step S3.

At the step S3, the provider B receives the message K1 520. From the step S3 control proceeds to the step S4 where the provider B determines whether the data to be returned to the receiver A fits into the data area 514. For example, the data area 514 may be 200 bytes in size. In this case, a determination is made in the step S4 as to whether the data to be returned to the receiver A is larger than 200 bytes. If the step S4 evaluates to no whereby the data to be returned from the provider B to the receiver A is 200 bytes or less, control proceeds from the step S4 to a step S5.

In the step S5, the provider B performs processing to return or send data to the receiver A in the static buffer BUFF1 510. The element 504 illustrates structures that may be used in returning data from the provider B to the receiver A in the step S5 if the amount or size of the data to be returned from B to A fits into the data area 514. If the amount or size of the data to be returned from the provider B to the data receiver A fits into the data area 514, the step S5 includes the provider B storing the data in the data area 514 of BUFF1 510. In this example, assume that the data to be returned from B to A is denoted by "DATA1" as stored in the data area 514. Additionally in the step S5, the provider B may populate other information into the static buffer BUFF1 510. For example, in the step S4 the provider B may store a CMD type denoted by C1 into the field 512a whereby C1 denotes a different command type or usage other than the new MD format denoted by the CMD type value of V1 discussed elsewhere herein. Once the provider B is done populating the BUFF1 510, control proceeds from the step S5 to a step S6 where the provider B sends a message or reply R1 521 to the receiver A. The reply R1 521 includes a field 521a that includes the address of, or pointer to (521b) the static buffer BUFF1.

Figure 6B:
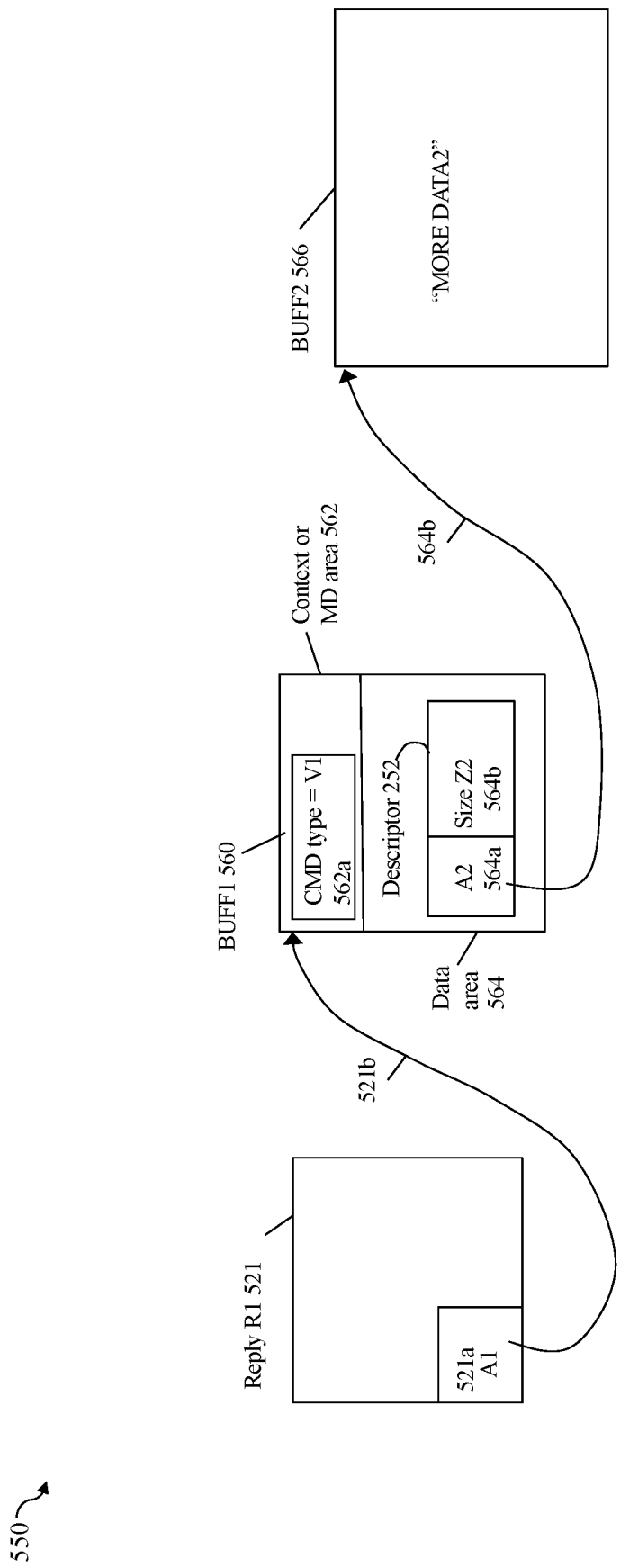

If the step S4 evaluates to yes whereby the data to be returned from the provider B to the receiver A more than 200 bytes, control proceeds from the step S4 to a step S7. FIG. 6B illustrates structures that may be used in returning data from the provider B to the receiver A in the step S7 if the amount or size of the data to be returned from B to A does not fit into the data area 564 of the static buffer BUFF1. The BUFF1 560 denotes the information stored in the static buffer BUFF1 in accordance with the new MD format or layout.

In the step S7, processing may be performed by the provider B to return or send data to the receiver A. The step S7 may include dynamically allocating the buffer BUFF2 566. The step S7 may also include populating the BUFF1 560 comprising 1) storing the value V1 in the CMD type field 562a of the context or MD area 562 to denote the new MD format; 2) storing the descriptor 252 for the dynamic buffer 566 in the data area 564 of the BUFF1 560; and 3) storing the data to be returned from B to A in the dynamically allocated buffer BUFF2 566. From the step S7, a step S8 is performed where the provider B sends the message or reply R1 521 to the receiver A. The reply R1 521 includes a field 521*a* that includes the address of, or pointer to (521*b*) the static buffer BUFF1.

As a first scenario, assume that the data sent from the provider B to the receiver A fits in the buffer BUFF1 whereby the provider B sends to the receiver A the reply R1 521 as in the element 504 of FIG. 6A. In this case with reference to 504 of FIG. 6A, the data receiver A may examine the CMD type 512*a* of the BUFF1 510 and determine that the CMD type is C1 and does not denote the new MSG format. Accordingly, the receiver A may read the data from the data area 514 of BUFF1 510.

As a second scenario, assume that the data sent from the provider B to the receiver A does not fit in the buffer BUFF1 whereby the provider B sends to the receiver A the reply R1 521 as in FIG. 6B. In this case with reference to FIG. 6B, the data receiver A may examine the CMD type 562*a* of the BUFF1 560 and determine that the CMD type is V1 and denotes the new MSG format. Accordingly, the receiver A may read the descriptor 252 for the BUFF2 566 from the data area 564 of BUFF1 560. The descriptor 252 includes the address A2 564*a* of the buffer BUFF2 566 and also the size Z2 564*b* of the buffer BUFF2 566. The receiver A may retrieve the data from the buffer BUFF2 566 using the descriptor 252.

Figure 7:
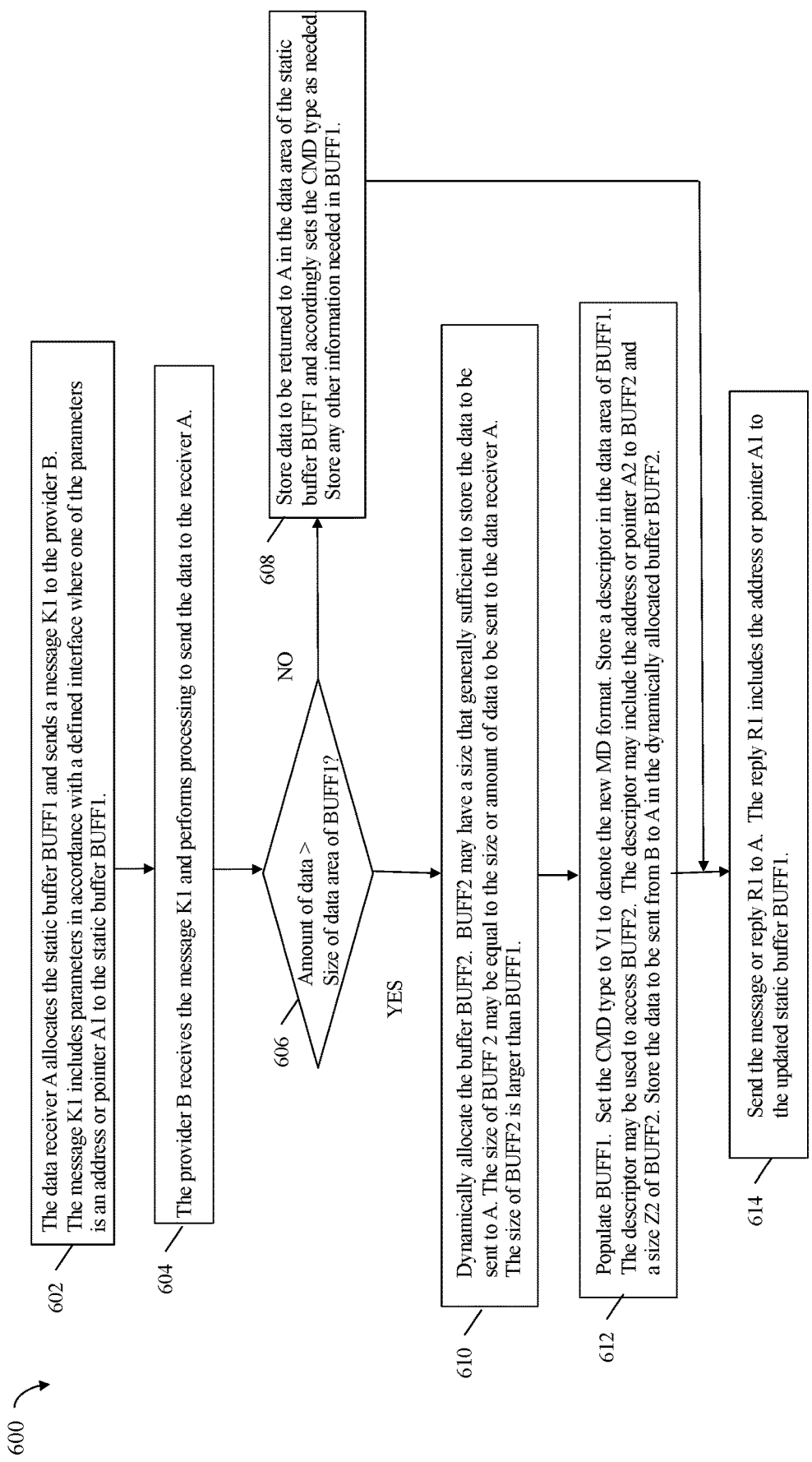
FIGS. 7, 8 and 9 are flowcharts of processing steps that may be performed in an embodiment in accordance with the techniques herein.
Figure 8:
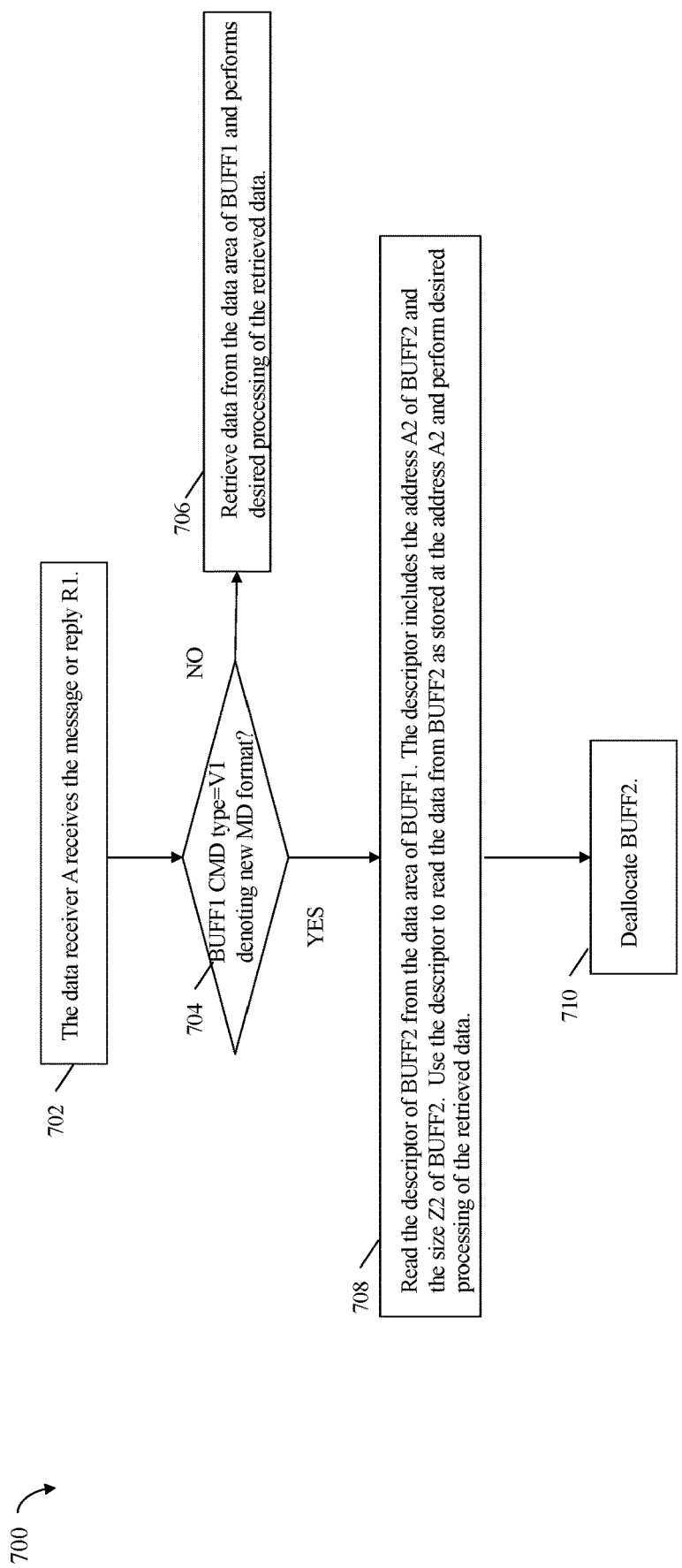

Referring to FIGS. 7 and 8, shown are flowcharts of processing steps that may be performed in an embodiment in accordance with the techniques herein. The flowcharts 600 and 700 summarize processing described above.

Referring to FIG. 7, at the step 602, the data receiver A allocates the static buffer BUFF1 and sends the message K1 to the provider B. The message K1 includes parameters in accordance with a defined interface where one of the parameters is an address or pointer A1 to the static buffer BUFF1. The step 602 of FIG. 7 includes processing described above in connection with the steps S1 and S2. From the step 602, control proceeds to the step 604.

At the step 604, the provider B receives the message K1 and performs processing to send the data to the receiver A. The step 604 of FIG. 7 includes processing described above in connection with the step S3. From the step 604, control proceeds to the step 606.

At the step 606, a determination is made as to whether the amount of data to be sent from the provider B to the receiver A is larger than the size of the data area of the static buffer, BUFF1. The step 606 of FIG. 7 includes processing described above in connection with the step S4. If the step 606 evaluates to no, control proceeds to the step 608.

At the step 608, the provider B performs processing to store data to be returned to A in the data area of the static buffer BUFF1 and accordingly sets the CMD type of BUFF1 as needed. The step 608 may also include the provider B storing any other information needed in BUFF1. The step 608 of FIG. 7 includes processing described above in connection with the step S5. From the step 608, control proceeds to the step 614.

If the step 606 evaluates to yes, control proceeds to the step 610, At the step 610, the provider B dynamically allocates the buffer BUFF2. The BUFF2 may have a size that generally sufficient to store the data to be sent to A. The size of BUFF 2 may be equal to the size or amount of data to be sent to the data receiver A. The size of BUFF2 is larger than BUFF1. From the step 610, control proceeds to the step 612.

At the step 612, the provider B populates the static buffer BUFF1 in accordance with the new MD format. The processing performed by the provider B in the step 612 may include: setting the CMD type to V1 to denote the new MD format; storing a descriptor in the data area of BUFF1; and storing the data to be sent from B to A in the dynamically allocated buffer BUFF2. The descriptor stored in the BUFF1 describes BUFF2 and may be used to access BUFF2. The descriptor may include the address or pointer A2 to BUFF2 and a size Z2 of BUFF2 The steps 610 and 612 of FIG. 7 includes processing described above in connection with the step S7. From the step 612, control proceeds to the step 614.

At the step 614, the provider performs processing to send the message or reply R1 to the receiver A. The reply R1 includes the address or pointer A1 to the updated static buffer BUFF1. The step 614 of FIG. 7 includes processing described above in connection with the steps S6 and S8.

Referring to FIG. 8, shown is a flowchart of processing steps that may be performed by the receiver A. The processing of the flowchart 700 is described above, for example, in connection with the different scenarios with respect to processing performed by the receiver A upon receiving the message or reply R1 521 from the provider B.

At the step 702, the receiver receives the message or reply R1 from the provider B. From the step 702, control proceeds to the step 704.

At the step 704, the data receiver A determines whether the CMD type of the static buffer BUFF1 is equal to V1 and thus denotes the new MD format. If the step 704 evaluates to no such as when the provider sends the reply or message R1 as illustrated in 504 of FIG. 6A, control proceeds to the step 706.

At the step 706, the data receiver A retrieves the data from the data area of BUFF1 and performs any desired processing of the retrieved data.

If the step 704 evaluates to yes such as when the provider sends the reply or message R1 as illustrated in FIG. 6B, control proceeds to the step 708.

In the step 708, the data receiver A reads the descriptor of BUFF2 from the data area of BUFF1. The descriptor includes the address A2 of BUFF2 and the size Z2 of BUFF2. The receiver A uses the descriptor to read the data from BUFF2 as stored at the address A2 and perform desired processing of the retrieved data. From the step 708, control proceeds to the step 710 where the data receiver A may deallocate the dynamically allocated buffer BUFF2 when BUFF2 is no longer needed by the receiver A.

Described above is an embodiment in which the techniques herein are utilized in connection with two code entities, A and B, executing in the same system that have access to the same memory.

The techniques herein may also be used in an embodiment including two different systems, System 1 (SYS1) and System 2 (SYS2), where the system SYS1 can directly access the system memory M2 of the system SYS2, and where the system SYS2 can directly access the system memory M1 of the system SYS1. The systems SYS1 and SYS2 may be any suitable systems. For example, the system SYS1 may be a data storage system or a host, and the system SYS2 may be a data storage system or a host.

In such an embodiment in which the techniques herein are used between the two systems SYS1 and SYS2, a direct memory access protocol, such as the RDMA (Remote Direct Memory Access) protocol, may be supported and utilized. For example, an embodiment may support and utilize RDMA over Converged Ethernet (RoCE) or RDMA over InfiniBand. RDMA is a technology that allows computers in a network to exchange data in main memory without involving the processor, cache or operating system of either computer. Like locally based Direct Memory Access (DMA), RDMA improves throughput and performance because it frees up resources. RDMA also facilitates a faster data transfer rate and low-latency networking. It can be implemented for networking and storage applications. RDMA enables more direct data movement in and out of a server by implementing a transport protocol in the network interface card (NIC) hardware. The technology supports a feature called zero-copy networking that makes it possible to read data directly from the main memory of one computer and write that data directly to the main memory of another computer. If both the sending and receiving systems support RDMA, then data exchanges between the two generally complete more quickly than comparable non-RDMA network systems.

In such an embodiment using the techniques herein between the systems SYS1 and SYS2, the systems SYS1 and SYS2 may communicate with one another using the RDMA protocol. In such an embodiment, for example, the system SYS1 may receive data from the system SYS2. Thus, the system SYS1 operates as the receiver A of the data and the system SYS2 operates as the provider or sender B of the data.

Figure 9:
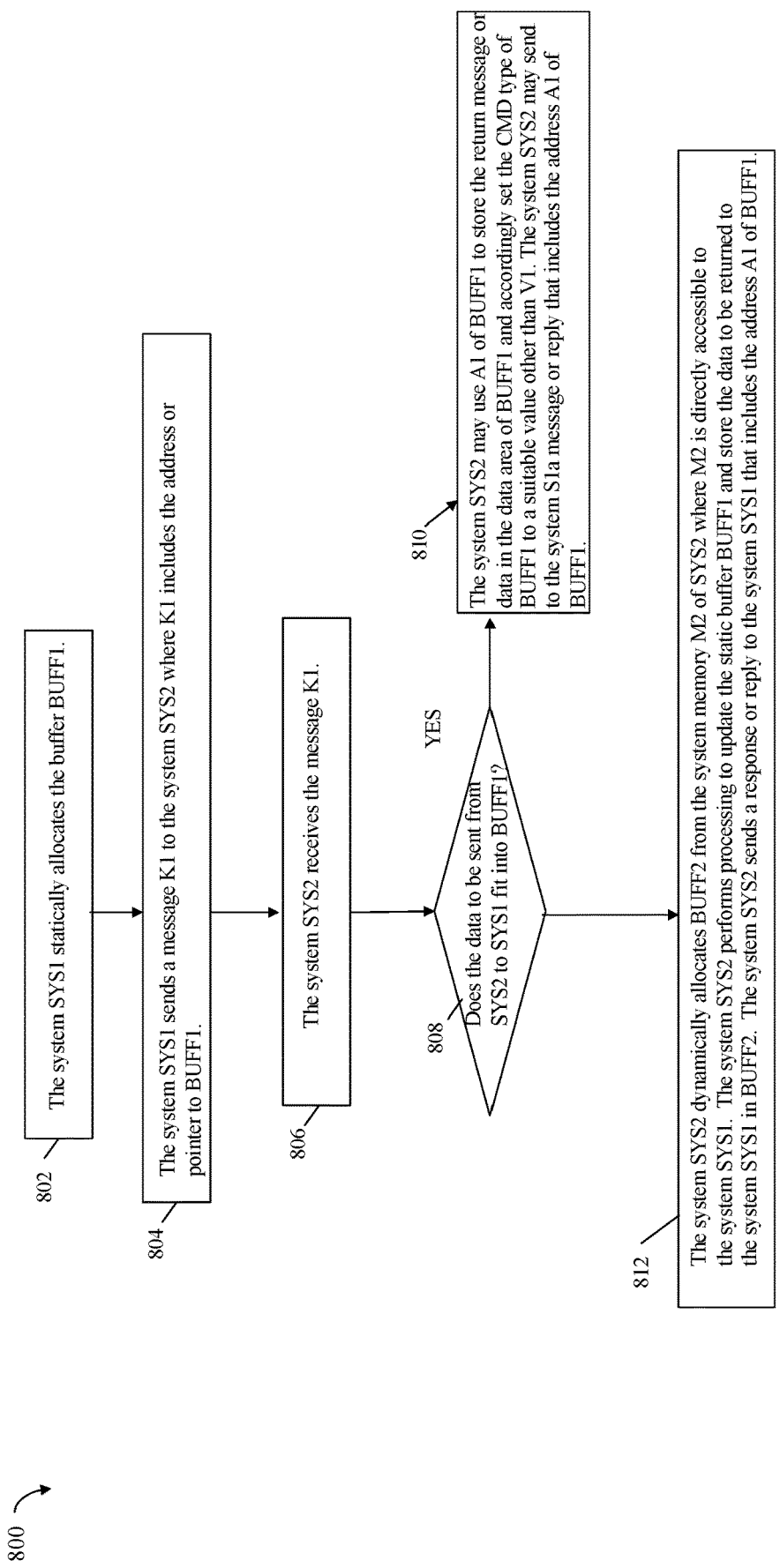

Consistent with other discussion herein and with reference to FIG. 9, in the step 802, the system SYS1 may allocate storage for the static buffer BUFF1 in the system memory M1 of the system SYS1 that is directly accessible to the system SYS2. From the step 802, control proceeds to the step 804 where the system SYS1 may send a first message K1 to the system SYS2 where the message K1 includes the address A1 of BUFF1 in M1. From the step 804 control proceeds to the step 806.

In the step 806, the system SYS2 receives the message K1 and may use A1 as included in the message K1 to directly access BUFF1 in M1 of the system SYS1. From the step 806, control proceeds to a step 808.

At the step 808, the system SYS2 determines whether the size of the message or amount of data to be returned from the system SYS2 to the system SYS1 fits into the data area of the static buffer BUFF1. For example, as discussed above the data area of BUFF1 may be 200 bytes. If the size of the message or amount of data to be returned from the system SYS2 to the system SYS1 is not greater than 200 bytes, the data fits into the data area of BUFF1 and the step 808 evaluates to yes. Responsive to the step 808 evaluating to yes, control proceeds to the step 810.

At the step 810, the system SYS2 may use A1 of BUFF1 to store the return message or data in the data area of BUFF1 and accordingly set the CMD type of BUFF1 to a suitable value other than V1. The system SYS2 may send to the system SYS1 a message or reply R1 that includes the address A1 of BUFF1.

Responsive to the step 808 evaluating to no where the size of the message or amount of data to be returned from the system SYS2 to the system SYS1 is more than 200 bytes, control proceeds to the step 812.

At the step 812, the system SYS2 may perform processing including:

1. Dynamically allocating BUFF2 from the system memory M2 of the system SYS2 where M2 is directly accessible to the system SYS1.

2. Performs processing to update the static buffer BUFF1 and store the data to be returned to the system SYS1 in BUFF2. Updating the BUFF1 in the step 812 may include setting the CMD type to V1 to denote that the data area of BUFF1 is to be interpreted by the system SYS2 in accordance with the MD format or layout. Updating BUFF1 in the step 812 may include storing the address A2 of BUFF2 in the data area of BUFF1 and storing the size Z2 of BUFF2 in the data area of BUFF1.

3. Sending to the system SYS1 a response or message R1 that includes A1, the address of BUFF1.

The system SYS1 may receive the response or message R1 sent by the system SYS2 in the steps 810 and 812. The system SYS1 may use A1 as included in R1 to read the CMD type field of BUFF1. If the CMD type is not equal to V1, the system SYS1 may retrieve and process the data from the data area of BUFF 1. If the CMD type is equal to V1, the system SYS1 interprets the data area of BUFF1 in accordance with the MD format or layout. In particular, if the CMD type is equal to V1, the system SYS1 reads A2 and Z2 from the data area of BUFF1 and uses A2 and Z2 to read the data of BUFF2 from M2. When BUFF2 is no longer needed, BUFF2 may be deallocated. In at least one embodiment, the system SYS1 may deallocate BUFF2 in accordance with the supported protocol used to access M2. As a variation to the above depending on the particular supported protocols, the system SYS2 may allocate BUFF2 from M1 rather than M2.

The techniques herein may be performed using any suitable hardware, firmware, software and/or other computer-implemented modules or devices having the described features and performing the described functions. For example, techniques herein may be performed by executing code which is stored on any one or more different forms of computer-readable media, where the code may be executed by one or more processors, for example, such as processors of a computer or other system, an ASIC (application specific integrated circuit), and the like. Computer-readable media may be non-transitory and may include different forms of volatile (e.g., RAM) and non-volatile (e.g., ROM, flash memory, magnetic or optical disks, or tape) storage which may be removable or non-removable. Embodiments of the techniques described herein may be used in connection with any appropriate operating system.

While the invention has been disclosed in connection with embodiments shown and described in detail, their modifications and improvements thereon will become readily apparent to those skilled in the art. Accordingly, the spirit and scope of the present invention should be limited only by the following claims.

What is claimed is:

1. A method of transmitting data comprising:
statically allocating a first buffer by a first entity;
providing a first address of the first buffer to a second entity;
determining, by the second code entity, whether first data to be returned to the first entity fits into a data area of the first buffer;
storing the first data in the data area of the first buffer responsive to determining the first data fits into the data area of the first buffer; and
responsive to determining the first data does not fit into the data area of the first buffer, performing first processing by the second entity, the first processing comprising:
dynamically allocating a second buffer that is large enough to hold the first data;
storing the first data in the second buffer;
storing a descriptor for the second buffer in the data area of the first buffer; and
storing an indicator in the first buffer, wherein the indicator has a first value that indicates the data area of the first buffer does not include the first data and is in accordance with a metadata format including a descriptor of the second buffer, wherein the second buffer includes the first data returned from the second entity to the first entity.

2. The method of claim 1, wherein the descriptor includes an address of the second buffer.

3. The method of claim 2, wherein the descriptor includes a size of the second buffer.

4. The method of claim 1, wherein the first entity and the second entity are code entities executing in a same system.

5. The method of claim 4, wherein the first entity and the second entity have access to a memory of the same system.

6. The method of claim 5, wherein the first buffer is a first portion of the memory of the same system, and wherein the second buffer is a second portion of the memory of the same computer.

7. The method of claim 1, further comprising:
sending a first message from the first entity to the second entity, wherein the first message includes a first address of the first buffer.

8. The method of claim 7, further comprising:
sending a second message from the second entity to the first entity, wherein the second message includes the first address of the first buffer.

9. The method of claim 8, further comprising performing second processing by the first entity responsive to receiving the second message.

10. The method of claim 9, wherein the second processing performed by the first entity includes:
using the first address of the first buffer to retrieve a current value for the indicator stored in the first buffer;
determining whether the current value of the indicator is equal to the first value; and
responsive to determining that the current value of the indicator is equal to the first value, performing third processing by the first entity comprising:
using the descriptor stored in the data area of the first buffer to read the first data stored in the second buffer.

11. The method of claim 10, wherein said second processing further includes:
responsive to determining that the current value of the indicator is not equal to the first value, retrieving the first data from the data area of the first buffer.

12. The method of claim 10, wherein the third processing performed by the first entity further includes:
deallocating the second buffer.

13. The method of claim 1, wherein the first entity is a first system having a first memory, the second entity is a second system having a second memory, the first system is configured to directly access the second memory of the second system, and the second system is configured to directly access the first memory of the first system.

14. The method of claim 13, wherein the first system and the second system communicate with one another in accordance with a remote direct memory access protocol that allows the first system to access the second memory, and allows the second system to directly access the first memory.

15. A system comprising:
at least one processor; and
at least one memory comprising code stored thereon that, when executed, performs a method of transmitting data comprising:
statically allocating a first buffer by a first entity;
providing a first address of the first buffer to a second entity;
determining, by the second code entity, whether first data to be returned to the first entity fits into a data area of the first buffer;
storing the first data in the data area of the first buffer responsive to determining the first data fits into the data area of the first buffer; and
responsive to determining the first data does not fit into the data area of the first buffer, performing first processing by the second entity, the first processing comprising:
dynamically allocating a second buffer that is large enough to hold the first data;
storing the first data in the second buffer;
storing a descriptor for the second buffer in the data area of the first buffer; and
storing an indicator in the first buffer, wherein the indicator has a first value that indicates the data area of the first buffer does not include the first data and is in accordance with a metadata format including a descriptor of the second buffer, wherein the second buffer includes the first data returned from the second entity to the first entity.

16. A computer readable medium comprising code stored thereon that, when executed, performs a method of transmitting data comprising:
statically allocating a first buffer by a first entity;
providing a first address of the first buffer to a second entity;
determining, by the second code entity, whether first data to be returned to the first entity fits into a data area of the first buffer;
storing the first data in the data area of the first buffer responsive to determining the first data fits into the data area of the first buffer; and
responsive to determining the first data does not fit into the data area of the first buffer, performing first processing by the second entity, the first processing comprising:
dynamically allocating a second buffer that is large enough to hold the first data;
storing the first data in the second buffer;
storing a descriptor for the second buffer in the data area of the first buffer; and
storing an indicator in the first buffer, wherein the indicator has a first value that indicates the data area of the first buffer does not include the first data and is in accordance with a metadata format including a descriptor of the second buffer, wherein the second buffer includes the first data returned from the second entity to the first entity.

17. The computer readable medium of claim 16, wherein the descriptor includes an address of the second buffer.

18. The computer readable medium of claim 17, wherein the descriptor includes a size of the second buffer.

19. The computer readable medium of claim 1, wherein the first entity and the second entity are code entities executing in a same system.

20. The computer readable medium of claim 19, wherein the first entity and the second entity have access to a memory of the same system.

* * * * *